(12) United States Patent
Hong et al.

(10) Patent No.: US 10,858,482 B2
(45) Date of Patent: Dec. 8, 2020

(54) COMPOSITION OF PREPARING POLY(IMIDE-BENZOXAZOLE) COPOLYMER, POLY(IMIDE-BENZOXAZOLE) COPOLYMER, ARTICLE CONTAINING POLY(IMIDE-BENZOXAZOLE) COPOLYMER, AND DISPLAY DEVICE INCLUDING SAME

(71) Applicants: SAMSUNG ELECTRONICS CO., LTD., Suwon-si (KR); SAMSUNG SDI CO., LTD., Yongin-si (KR)

(72) Inventors: Sung Woo Hong, Seoul (KR); Byung-hee Sohn, Yongin-si (KR); Sun Jin Song, Seoul (KR); Chanjae Ahn, Seoul (KR); Kyeong-sik Ju, Suwon-si (KR); Sungwon Choi, Hwaseong-si (KR)

(73) Assignees: SAMSUNG ELECTRONICS CO., LTD., Gyeonggi-Do (KR); SAMSUNG SDI CO., LTD., Gyeonggi-Do (KR)

( * ) Notice: Subject to any disclaimer, the term of this patent is extended or adjusted under 35 U.S.C. 154(b) by 734 days.

(21) Appl. No.: 14/879,287

(22) Filed: Oct. 9, 2015

(65) Prior Publication Data

US 2016/0237214 A1 Aug. 18, 2016

(30) Foreign Application Priority Data

Feb. 12, 2015 (KR) .................. 10-2015-0021853

(51) Int. Cl.
| | | |
|---|---|---|
| *C08G 73/22* | (2006.01) | |
| *C08G 73/10* | (2006.01) | |
| *C08G 73/14* | (2006.01) | |
| *C08J 5/18* | (2006.01) | |
| *C09D 179/08* | (2006.01) | |
| *C09D 179/04* | (2006.01) | |

(52) U.S. Cl.
CPC ......... *C08G 73/22* (2013.01); *C08G 73/1039* (2013.01); *C08G 73/1042* (2013.01); *C08G 73/1067* (2013.01); *C08G 73/1085* (2013.01); *C08G 73/14* (2013.01); *C08J 5/18* (2013.01); *C08J 2479/04* (2013.01); *C08J 2479/08* (2013.01); *C09D 179/04* (2013.01); *C09D 179/08* (2013.01); *Y10T 428/31721* (2015.04)

(58) Field of Classification Search
CPC ............... C08G 73/22; C08G 73/1085; C08G 73/1039; C08G 73/1042; C08G 73/1067; C08G 73/14; C08J 2479/04; C08J 5/18; C08J 2479/08; C09D 179/08; C09D 179/04; Y10T 428/31721
See application file for complete search history.

(56) References Cited

U.S. PATENT DOCUMENTS

| | | | | |
|---|---|---|---|---|
| 4,018,735 A | * | 4/1977 | Nakagawa ............. | C08G 69/12 524/104 |
| 4,978,733 A | * | 12/1990 | Khanna .................. | C08G 73/14 524/599 |
| 5,741,585 A | * | 4/1998 | Harris ................. | C08G 73/1085 428/357 |
| 5,919,892 A | * | 7/1999 | Hwang .................. | C08G 73/22 528/220 |
| 6,291,635 B1 | * | 9/2001 | Maeda ................... | C08G 73/22 525/420 |
| 7,129,005 B2 | | 10/2006 | Wensley et al. | |
| 7,968,670 B2 | | 6/2011 | Jung et al. | |
| 2004/0253520 A1 | | 12/2004 | Wensley et al. | |
| 2009/0226642 A1 | | 10/2009 | Simone et al. | |
| 2010/0048861 A1 | | 2/2010 | Jung et al. | |
| 2013/0035447 A1 | | 2/2013 | Jeong et al. | |
| 2015/0159043 A1 | * | 6/2015 | Lai ........................ | H05K 1/036 428/213 |

FOREIGN PATENT DOCUMENTS

| | | |
|---|---|---|
| JP | 2000292635 | 10/2000 |
| KR | 101167337 | 7/2012 |

(Continued)

OTHER PUBLICATIONS

Wu, S., Yuen, S., Ma, C. M. and Huang, Y. (2009), Synthesis and properties of aromatic polyimide, poly(benzoxazole imide), and poly(benzoxazole amide imide). J. Appl. Polym. Sci., 113: 2301-2312. doi:10.1002/app.30212 (Year: 2009).*

*Primary Examiner* — John D Freeman
(74) *Attorney, Agent, or Firm* — Cantor Colburn LLP

(57) ABSTRACT

A composition for preparing poly(imide-benzoxazole) copolymer is described, where the copolymer include: a tetracarboxylic acid dianhydride represented by Chemical Formula 1, a diamine represented by Chemical Formula 2, and a diamine represented by Chemical Formula 3:

Chemical Formula 1

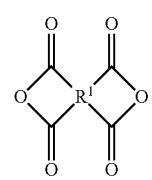

Chemical Formula 2

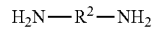

Chemical Formula 3

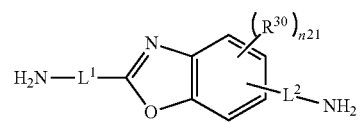

wherein definitions of groups and variables in Chemical Formulae 1 to 3 are the same as described in the specification.

10 Claims, No Drawings

(56) References Cited

FOREIGN PATENT DOCUMENTS

| | | |
|---|---|---|
| KR | 101186040 | 9/2012 |
| KR | 101211857 | 12/2012 |
| KR | 101328838 | 11/2013 |
| KR | 101339663 | 12/2013 |
| KR | 101339673 | 12/2013 |
| WO | 2004102694 | 11/2004 |
| WO | 2008072914 | 6/2008 |
| WO | 2011122842 | 10/2011 |

\* cited by examiner

COMPOSITION OF PREPARING POLY(IMIDE-BENZOXAZOLE) COPOLYMER, POLY(IMIDE-BENZOXAZOLE) COPOLYMER, ARTICLE CONTAINING POLY(IMIDE-BENZOXAZOLE) COPOLYMER, AND DISPLAY DEVICE INCLUDING SAME

CROSS-REFERENCE TO RELATED APPLICATION

This application claims priority to Korean Patent Application No. 10-2015-0021853, filed on Feb. 12, 2015, and all the benefits accruing therefrom under 35 U.S.C. § 119, the content of which is incorporated herein in its entirety by reference.

BACKGROUND

1. Field

This disclosure relates to a composition for preparing poly(imide-benzoxazole)copolymer, poly(imide-benzoxazole)copolymer, article containing poly(imide-benzoxazole) copolymer, and display device including the article.

2. Description of the Related Art

A need for a flexible, thin, light, and portable display, which requires low electric power, and which can be carried without being limited to the place or time, increases. In order to fabricate the flexible display, numerous constituting parts such as a substrate for the flexible display, organic or inorganic material to be processed, flexible electronics, encapsulating and packaging technology are strongly desired.

To be applicable in a flexible display, it is desired that a transparent plastic film for replacing conventional window cover glass have high hardness and good optical properties.

Although hardness of the transmittance plastic film may be supplemented by coating a hard-coating layer on the transmittance plastic film, high tension modulus (hereinbelow, referred to as 'modulus') of the base film may be helpful to increase hardness of the final film.

Desired optical properties may include high transmittance for light, low haze, low yellowness index (YI), and the like.

Thus, there remains a need for a polymer film having high modulus, low YI, and anti-UV color change properties.

SUMMARY

An embodiment relates to a composition for preparing a poly(imide-benzoxazole) copolymer.

Another embodiment relates to a poly(imide-benzoxazole) copolymer.

Another embodiment relates to an article including the poly(imide-benzoxazole) copolymer having high tension modulus and low yellowness index.

Another embodiment relates to a display device including an article prepared from a poly(imide-benzoxazole) copolymer.

According to an embodiment, provided is a composition for preparing a poly(imide-benzoxazole) copolymer, including:
a tetracarboxylic acid dianhydride represented by Chemical Formula 1,
a first diamine represented by Chemical Formula 2, and
a second diamine represented by Chemical Formula 3:

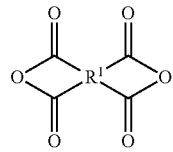

Chemical Formula 1

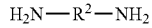

Chemical Formula 2

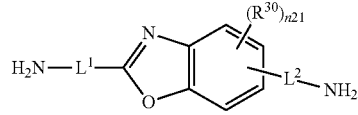

Chemical Formula 3 wherein in Chemical Formulae 1 and 2,
$R^1$ and $R^2$ are the same or different, and are each independently a substituted or unsubstituted C4 to C30 alicyclic organic group, or a substituted or unsubstituted C6 to C30 aromatic organic group, wherein the aromatic organic group includes one aromatic ring, two or more aromatic rings fused together to provide a condensed ring system, or two or more aromatic rings linked through a single bond or through a functional group selected from a fluorenylene group, —O—, —S—, —C(=O)—, —CH(OH)—, —S(=O)$_2$—, —Si(CH$_3$)$_2$—, —(CH$_2$)$_p$— wherein 1≤p≤10, —(CF$_2$)$_q$— wherein 1≤q≤10, —C(CH$_3$)$_2$—, —C(CF$_3$)$_2$—, —C(=O)NH—, a substituted or unsubstituted C3 to C10 cycloalkylene group, a substituted or unsubstituted C6 to C15 arylene group, and a combination thereof, wherein in Chemical Formula 3,
$L^1$ and $L^2$ are the same or different, and are each independently selected from a substituted or unsubstituted C1 to C30 aliphatic organic group, a substituted or unsubstituted C3 to C30 alicyclic organic group, a substituted or unsubstituted C6 to C30 aromatic organic group, a substituted or unsubstituted C3 to C30 heterocycloalkylene group, —O—, —S—, —C(=O)—, —CH(OH)—, —S(=O)$_2$—, —Si(CH$_3$)$_2$—, —(CH$_2$)$_p$— wherein 1≤p≤10, —(CF$_2$)$_q$— wherein 1≤q≤10, —C(CF$_3$)$_2$—, —C(=O)NH—, and a combination thereof, $R^{30}$ is a substituted or unsubstituted C1 to C30 alkyl group, a substituted or unsubstituted C2 to C30 alkenyl group, a substituted or unsubstituted C2 to C30 alkynyl group, a substituted or unsubstituted C1 to C30 alkoxy group, a substituted or unsubstituted C3 to C30 cycloalkyl group, a substituted or unsubstituted C2 to C30 heterocycloalkyl group, a substituted or unsubstituted C1 to C30 heteroalkyl group, a substituted or unsubstituted C7 to C20 arylakyl group, a substituted or unsubstituted C6 to C30 aryl group, a substituted or unsubstituted C1 to C30 acyl group, a hydroxy group, a nitro group, a halogen, and a combination thereof, and n21 is an integer from 0 to 3.

The tetracarboxylic acid dianhydride represented by Chemical Formula 1 may be one or more selected from 3,3',4,4'-biphenyltetracarboxylic dianhydride, bicyclo[2.2.2]oct-7-ene-2,3,5,6-tetracarboxylic dianhydride, 3,3',4,4'-diphenylsulfone tetracarboxylic dianhydride, 4,4'-(hexafluoroisopropylidene)diphthalic anhydride, 4,4'-oxydiphthalic anhydride, pyromellitic dianhydride, 4-(2,5-dioxotetrahydrofuran-3-yl)-1,2,3,4-tetrahydronaphthalene-1,2-dicarboxylic anhydride, and bis(3,4-dicarboxyphenyl)sulfone dianhydride.

For example, the tetracarboxylic acid dianhydride represented by Chemical Formula 1 may include a combination of 3,3',4,4'-biphenyl tetracarboxylic dianhydride and 4,4'-(hexafluoroisopropylidene)diphthalic anhydride.

The first diamine represented by Chemical Formula 2 may be one or more selected from chemical formulae:

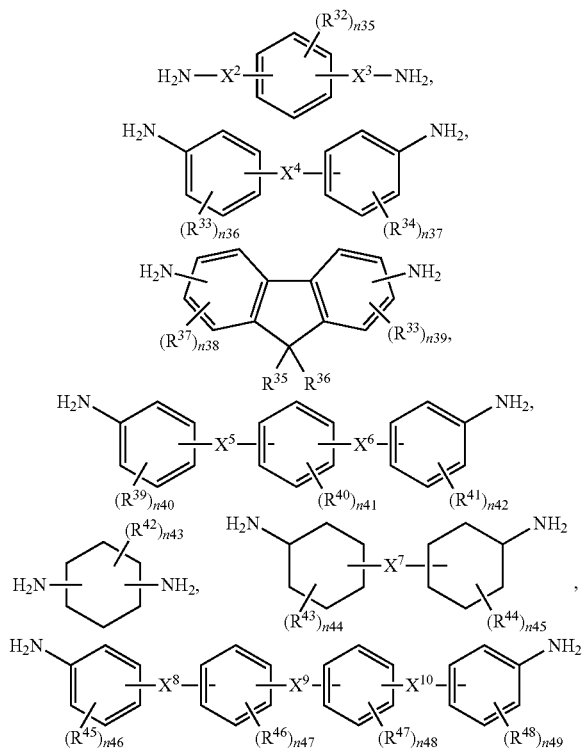

wherein in the above chemical formulae, $R^{32}$ to $R^{45}$ are the same or different and may each independently be hydrogen, a halogen, a nitro group, a substituted or unsubstituted C1 to C15 alkyl group, a substituted or unsubstituted C1 to C15 alkoxy group, a substituted or unsubstituted C1 to C15 fluoroalkyl group, a substituted or unsubstituted C3 to C15 cycloalkyl group, a substituted or unsubstituted C3 to C15 heterocycloalkyl group, a substituted or unsubstituted C3 to C15 cycloalkoxy group, a substituted or unsubstituted C6 to C15 aryl group, a substituted or unsubstituted C6 to C15 aryloxy group, or a substituted or unsubstituted C2 to C15 heteroaryl group, $X^2$ to $X^{10}$ are the same or different and may each independently be a single bond, a substituted or unsubstituted C1 to C10 alkylene group, a substituted or unsubstituted C3 to C10 cycloalkylene group, a substituted or unsubstituted C5 to C40 heterocycloalkylene group, a substituted or unsubstituted C6 to C15 arylene group, a substituted or unsubstituted C3 to C40 heteroarylene group, —SO$_2$—, —O—, —C(=O)—, or a combination thereof, n35 to n37, and n40 to n49, are integers ranging from 0 to 4, and n38 and n39 are integers ranging from 0 to 3.

The first diamine represented by Chemical Formula 2 may be 2,2'-bis(trifluoromethyl)benzidine.

In Chemical Formula 3, $L^1$ maybe phenylene group, $L^2$ may be a single bond, and n21 may be 0.

The mole ratio of the tetracarboxylic acid dianhydride represented by Chemical Formula 1 to the total moles of the first diamine represented by Chemical Formula 2 and the second diamine represented by Chemical Formula 3 may be about 1:1, where an amount of the second diamine represented by Chemical Formula 3 may be less than 10 mol % based on the total mole number of the diamines represented by Chemical Formula 2 and Chemical Formula 3.

An amount of the second diamine represented by Chemical Formula 3 may be from about 0.1 mol % to about 8 mol % based on the total moles of the diamine represented by Chemical Formula 2 and the diamine represented by Chemical Formula 3.

The tetracarboxylic acid dianhydride represented by Chemical Formula 1 may include a mixture of about 10 mole percent to about 55 mole percent of 3,3',4,4'-biphenyl tetracarboxylic dianhydride and about 90 mole percent to about 45 mole percent of 4,4'-(hexafluoroisopropylidene)diphthalic anhydride.

According to another embodiment, provided is a poly(imide-benzoxazole) copolymer prepared from the composition for preparing poly(imide-benzoxazole) copolymer.

The poly(imide-benzoxazole) copolymer may include (i) a structural unit represented by Chemical Formula 4, Chemical Formula 5, or a combination thereof; and (ii) a structural unit represented by Chemical Formula 6, Chemical Formula 7, or a combination thereof:

Chemical Formula 4

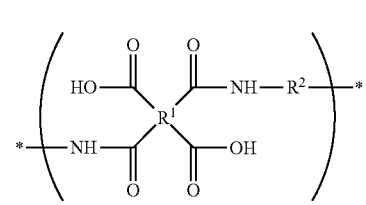

Chemical Formula 5

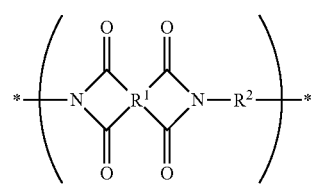

Chemical Formula 6

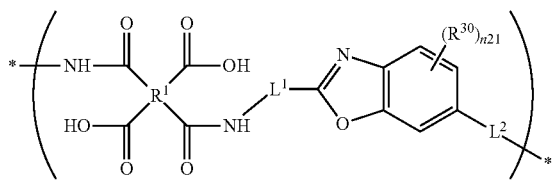

Chemical Formula 7

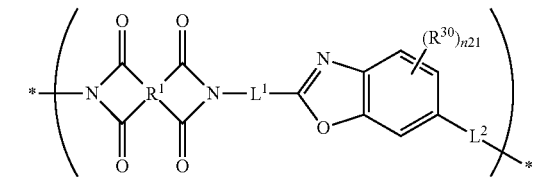

in Chemical Formulae 4 to 7, $R^1$ and $R^2$ are the same or different, and are each independently a substituted or unsubstituted C4 to C30 alicyclic organic group, or a substituted or unsubstituted C6 to C30 aromatic organic group, wherein the aromatic organic group includes one aromatic ring, two or more aromatic rings fused together to provide a condensed ring system, or two or more aromatic rings linked through a single bond or through a functional group selected from a fluorenylene group, —O—, —S—, —C(=O)—, —CH(OH)—, —S(=O)$_2$—, —Si(CH$_3$)$_2$—, —(CH$_2$)$_p$— wherein 1≤p≤10, —(CF$_2$)$_q$— wherein 1≤q≤10, —C(CH$_3$)$_2$—, —C(CF$_3$)$_2$—, —C(=O)NH—, a substituted or unsubstituted C3 to C10 cycloalkylene group, a substituted or unsubstituted C6 to C15 arylene group, and a combination thereof, L$^1$ and L$^2$ are the same or different, and are each independently selected from a substituted or unsubstituted C1 to C30 aliphatic organic group, a substituted or unsubstituted C3 to C30 alicyclic organic group, a substituted or unsubstituted C6 to C30 aromatic organic group, a substituted or unsubstituted C3 to C30 heterocycloalkylene group, —O—, —S—, —C(=O)—, —CH(OH)—, —S(=O)$_2$—, —Si(CH$_3$)$_2$—, —(CH$_2$)$_p$— wherein 1≤p≤10, —(CF$_2$)$_q$— wherein 1≤q≤10, —C(CF$_3$)$_2$—, —C(=O)NH—, and a combination thereof, R$^{30}$ is a substituted or unsubstituted C1 to C30 alkyl group, a substituted or unsubstituted C2 to C30 alkenyl group, a substituted or unsubstituted C2 to C30 alkynyl group, a substituted or unsubstituted C1 to C30 alkoxy group, a substituted or unsubstituted C3 to C30 cycloalkyl group, a substituted or unsubstituted C2 to C30 heterocycloalkyl group, a substituted or unsubstituted C1 to C30 heteroalkyl group, a substituted or unsubstituted C7 to C20 arylakyl group, a substituted or unsubstituted C6 to C30 aryl group, a substituted or unsubstituted C1 to C30 acyl group, a hydroxy group, a nitro group, a halogen, and a combination thereof, and n21 is an integer from 0 to 3.

R$^1$ in Chemical Formulae 4 to 7 may be represented by Chemical Formula 8 or Chemical Formula 9:

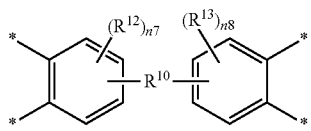

Chemical Formula 8

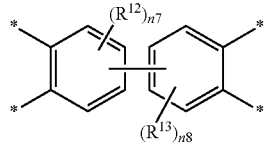

Chemical Formula 9

In Chemical Formula 8,

R$^{10}$ is the same or different in each structural unit, and is independently a single bond, a substituted or unsubstituted C1 to C30 aliphatic organic group, a substituted or unsubstituted C3 to C30 cyclic organic group, a substituted or unsubstituted C6 to C30 aromatic organic group, or a substituted or unsubstituted C2 to C30 heterocyclic group, In Chemical Formulae 8 and 9, R$^{12}$ and R$^{13}$ are the same or different, and are independently a halogen, a hydroxy group, a substituted or unsubstituted C1 to C10 aliphatic organic group, a substituted or unsubstituted C6 to C20 aromatic organic group, an alkoxy group of formula —OR$^{208}$, wherein R$^{208}$ is a C1 to C10 aliphatic organic group, or a silyl group of formula —SiR$^{209}$R$^{210}$R$^{211}$, wherein R$^{209}$, R$^{210}$, and R$^{211}$ are the same or different, and are independently hydrogen or a C1 to C10 aliphatic organic group, and n7 and n8 are independently integers ranging from 0 to 3.

In Chemical Formula 4 or Chemical Formula 5, R$^2$ may be represented by one or more selected from Chemical Formulae 10 to 12:

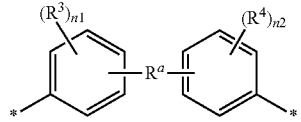

Chemical Formula 10

In Chemical Formula 10,

R$^a$ is the same or different in each structural unit, and is independently a substituted or unsubstituted C3 to C30 alicyclic organic group, a substituted or unsubstituted C6 to C30 aromatic organic group, or a substituted or unsubstituted C2 to C30 heterocyclic group, or a substituted or unsubstituted C13 to C20 fluorenylene group, R$^3$ and R$^4$ are the same or different, and are independently a halogen, a hydroxy group, a substituted or unsubstituted C1 to C10 aliphatic organic group, a C6 to C20 aromatic organic group, an alkoxy group of formula —OR$^{200}$, wherein R$^{200}$ is a C1 to C10 aliphatic organic group, or a silyl group of formula —SiR$^{201}$R$^{202}$R$^{203}$, wherein R$^{201}$, R$^{202}$, and R$^{203}$ are the same or different, and are independently hydrogen or a C1 to C10 aliphatic organic group, and n1 and n2 are independently integers ranging from 0 to 4.

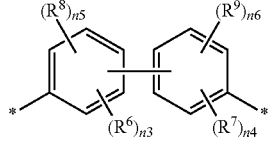

Chemical Formula 11

In Chemical Formula 11,

R$^6$ and R$^7$ are the same or different and each are independently an electron withdrawing group selected from —CF$_3$, —CCl$_3$, —CBr$_3$, —Cl$_3$, —F, —Cl, —Br, —I, —NO$_2$, —CN, —COCH$_3$, and —CO$_2$C$_2$H$_5$, R$^8$ and R$^9$ are the same or different, and each are independently a halogen, a hydroxy group, a substituted or unsubstituted C1 to C10 aliphatic organic group, a substituted or unsubstituted C6 to C20 aromatic organic group, an alkoxy group of formula —OR$^{204}$, wherein R$^{204}$ is a C1 to C10 aliphatic organic group, or a silyl group of formula —SiR$^{205}$R$^{206}$R$^{207}$, wherein R$^{205}$, R$^{206}$, and R$^{207}$ are the same or different, and each are independently a hydrogen, a C1 to C10 aliphatic organic group, n3 is an integer ranging from 1 to 4, n5 is an integer ranging from 0 to 3, provided that n3+n5 is an integer ranging from 1 to 4, n4 is an integer ranging from 1 to 4, and n6 is an integer ranging from 0 to 3, provided that n4+n6 is an integer ranging from 1 to 4.

Chemical Formula 12

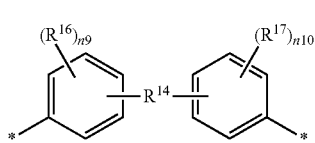

In Chemical Formula 12, $R^{14}$ is O, S, C(=O), CH(OH), S(=O)$_2$, Si(CH$_3$)$_2$, (CH$_2$)$_p$ wherein $1 \leq p \leq 10$, (CF$_2$)$_q$ wherein $1 \leq q \leq 10$, C(CH$_3$)$_2$, C(CF$_3$)$_2$, C(=O)NH, or a substituted or unsubstituted C6 to C30 aromatic organic group, wherein the aromatic organic group includes one aromatic ring, two or more aromatic rings fused together to provide a condensed ring system, or two or more aromatic rings linked through a single bond or through a functional group selected from a fluorenylene group, O, S, C(=O), CH(OH), S(=O)$_2$, Si(CH$_3$)$_2$, (CH$_2$)$_p$ wherein $1 \leq p \leq 10$, (CF$_2$)$_q$ wherein $1 \leq q \leq 10$, C(CH$_3$)$_2$, C(CF$_3$)$_2$, and C(=O)NH, $R^{16}$ and $R^{17}$ are the same or different, and each are independently a halogen, a hydroxy group, a substituted or unsubstituted C1 to C10 aliphatic organic group, a substituted or unsubstituted C6 to C20 aromatic organic group, an alkoxy group of formula —OR$^{212}$, wherein $R^{212}$ is a C1 to C10 aliphatic organic group, or a silyl group of formula —SiR$^{213}$R$^{214}$R$^{215}$, wherein $R^{213}$, $R^{214}$, and $R^{215}$ are the same or different, and each are independently a hydrogen or a C1 to C10 aliphatic organic group, and n9 and n10 are each independently an integer ranging from 0 to 4.

$R^1$ in Chemical Formulae 4 to 7 may be represented by Chemical Formula 8 and Chemical Formula 9, where n7 and n8 is 0, and $R^{10}$ is C(CF$_3$)$_2$.

$R^2$ in Chemical Formula 4 and Chemical Formula 5 may be represented by Chemical Formula 13:

Chemical Formula 13

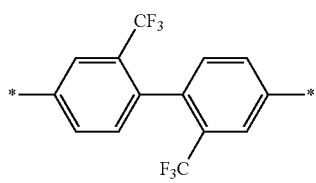

In Chemical Formula 6 and Chemical Formula 7, $L^1$ may be a phenylene group, and $L^2$ may be a single bond, and n21 may be 0.

The structural unit represented by Chemical Formula 6, Chemical Formula 7, or a combination thereof may be included in an amount of less than about 10 mol % based on the mole number of the total structural units included in the poly(imide-benzoxazole) copolymer.

$R^1$ may include the structural unit represented by Chemical Formula 8 in an amount of about 90 mol % to about 45 mol %, and the structural unit represented by Chemical Formula 9 in an amount of about 10 mol % to about 55 mol % in the poly(imide-benzoxazole) copolymer.

The poly(imide-benzoxazole) copolymer may further include one or more selected from the structural unit represented by Chemical Formulae 14 to 17:

Chemical Formula 14

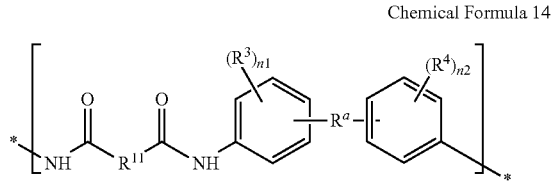

In Chemical Formula 14, $R^a$ is a substituted or unsubstituted C3 to C30 alicyclic organic group, a substituted or unsubstituted C6 to C30 aromatic organic group, a substituted or unsubstituted C2 to C30 heterocyclic group, or a substituted or unsubstituted C13 to C20 fluorenylene group, $R^{11}$ is a substituted or unsubstituted C6 to C30 aromatic organic group, $R^3$ and $R^4$ are the same or different and each are independently a halogen, a hydroxy group, a substituted or unsubstituted C1 to C10 aliphatic organic group, a substituted or unsubstituted C6 to C20 aromatic organic group, an alkoxy group of formula —OR$^{200}$, wherein $R^{200}$ is a C1 to C10 aliphatic organic group, a silyl group of formula —SiR$^{201}$R$^{202}$R$^{203}$, wherein $R^{201}$, $R^{202}$, and $R^{203}$ are the same or different and each are independently a hydrogen, or a C1 to C10 aliphatic organic group, and n1 and n2 are the same or different and each are independently an integer ranging from 0 to 4.

Chemical Formula 15

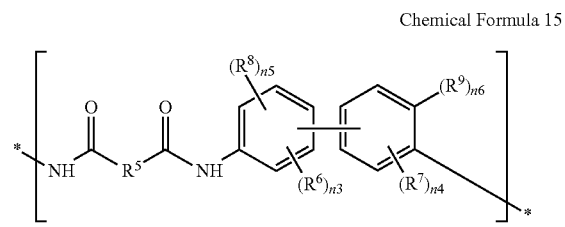

In Chemical Formula 15, $R^5$ is a substituted or unsubstituted C6 to C30 aromatic organic group, $R^6$ and $R^7$ are the same or different and each are independently an electron withdrawing group selected from —CF$_3$, —CCl$_3$, —CBr$_3$, —Cl$_3$, —F, —Cl, —Br, —I, —NO$_2$, —CN, —COCH$_3$, and —CO$_2$C$_2$H$_5$, $R^8$ and $R^9$ are the same or different, and each are independently a halogen, a hydroxy group, a substituted or unsubstituted C1 to C10 aliphatic organic group, a substituted or unsubstituted C6 to C20 aromatic organic group, an alkoxy group of formula —OR$^{204}$, wherein $R^{204}$ is a C1 to C10 aliphatic organic group, or a silyl group of formula —SiR$^{205}$R$^{206}$R$^{207}$, n rein $R^{205}$, $R^{206}$, and $R^{207}$ are the same or different, and each are independently a hydrogen, a C1 to C10 aliphatic organic group, n3 is an integer ranging from 1 to 4, n5 is an integer ranging from 0 to 3, provided that n3+n5 is an integer ranging from 1 to 4, n4 is an integer ranging from 1 to 4, and n6 is an integer ranging from 0 to 3, provided that n4+n6 is an integer ranging from 1 to 4.

Chemical Formula 16

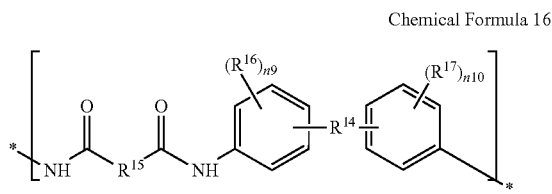

In Chemical Formula 16, $R^{14}$ is O, S, C(=O), CH(OH), S(=O)$_2$, Si(CH$_3$)$_2$, (CH$_2$)$_p$ wherein 1≤p≤10, (CF$_2$)$_q$ wherein 1≤q≤10, C(CH$_3$)$_2$, C(CF$_3$)$_2$, C(=O)NH, or a substituted or unsubstituted C6 to C30 aromatic organic group, wherein the aromatic organic group includes one aromatic ring, two or more aromatic rings fused together to provide a condensed ring system, or two or more aromatic rings linked through a single bond or through a functional group selected from a fluorenylene group, O, S, C(=O), CH(OH), S(=O)$_2$, Si(CH$_3$)$_2$, (CH$_2$)$_p$ wherein 1≤p≤10, (CF$_2$)$_q$ wherein 1≤q≤10, C(CH$_3$)$_2$, C(CF$_3$)$_2$, and C(=O)NH, $R^{15}$ is a substituted or unsubstituted C6 to C30 aromatic organic group, $R^{16}$ and $R^{17}$ are the same or different, and each are independently a halogen, a hydroxy group, a substituted or unsubstituted C1 to C10 aliphatic organic group, a substituted or unsubstituted C6 to C20 aromatic organic group, an alkoxy group of formula —OR$^{212}$, wherein R$^{212}$ is a C1 to C10 aliphatic organic group, or a silyl group of formula —SiR$^{213}$R$^{214}$R$^{215}$, wherein R$^{213}$, R$^{214}$, and R$^{215}$ are the same or different, and each are independently a hydrogen or a C1 to C10 aliphatic organic group, and n9 and n10 are each independently an integer ranging from 0 to 4.

Chemical Formula 17

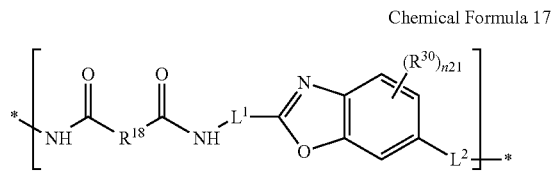

In Chemical Formula 17, $R^{18}$ is O, S, C(=O), CH(OH), S(=O)$_2$, Si(CH$_3$)$_2$, (CH$_2$)$_p$ wherein 1≤p≤10, (CF$_2$)$_q$ wherein 1≤q≤10, C(CH$_3$)$_2$, C(CF$_3$)$_2$, C(=O)NH, or a substituted or unsubstituted C6 to C30 aromatic organic group, wherein the aromatic organic group includes one aromatic ring, two or more aromatic rings fused together to provide a condensed ring system, or two or more aromatic rings linked through a single bond or through a functional group selected from a fluorenylene group, O, S, C(=O), CH(OH), S(=O)$_2$, Si(CH$_3$)$_2$, (CH$_2$)$_p$ wherein 1≤p≤10, (CF$_2$)$_q$ wherein 1≤q≤10, C(CH$_3$)$_2$, C(CF$_3$)$_2$, and C(=O)NH, $L^1$ and $L^2$ are the same or different, and are each independently selected from a substituted or unsubstituted C1 to C30 aliphatic organic group, a substituted or unsubstituted C3 to C30 alicyclic organic group, a substituted or unsubstituted C6 to C30 aromatic organic group, a substituted or unsubstituted C3 to C30 heterocycloalkylene group, —O—, —S—, —C(=O)—, —CH(OH)—, —S(=O)$_2$—, —Si(CH$_3$)$_2$—, —(CH$_2$)$_p$— wherein 1≤p≤10, —(CF$_2$)$_q$— wherein 1≤q≤10, —C(CF$_3$)$_2$—, —C(=O)NH—, and a combination thereof, $R^{30}$ is a substituted or unsubstituted C1 to C30 alkyl group, a substituted or unsubstituted C2 to C30 alkenyl group, a substituted or unsubstituted C2 to C30 alkynyl group, a substituted or unsubstituted C1 to C30 alkoxy group, a substituted or unsubstituted C3 to C30 cycloalkyl group, a substituted or unsubstituted C2 to C30 heterocycloalkyl group, a substituted or unsubstituted C1 to C30 heteroalkyl group, a substituted or unsubstituted C7 to C20 arylakyl group, a substituted or unsubstituted C6 to C30 aryl group, a substituted or unsubstituted C1 to C30 acyl group, a hydroxy group, a nitro group, a halogen, and a combination thereof, and n21 is an integer from 0 to 3.

According to yet another embodiment, provided is an article prepared from the poly(imide-benzoxazole) copolymer according to an embodiment.

The article may be a film, fiber, or coating or adhesive material.

The article may be a film having a thickness of about 50 micrometers, and the film may have about less than 5.5 of YI, measured by using ASTM D1926, and about 4.0 GPa or higher of tension modulus, measured by ASTM D882.

According to still another embodiment, provided is a display device including the article.

Hereinafter, further embodiments will be described in detail.

DETAILED DESCRIPTION

This disclosure will be described more fully hereinafter with reference to the following embodiments. This disclosure may, however, be embodied in many different forms and is not to be construed as limited to the exemplary embodiments set forth herein.

It will be understood that when an element is referred to as being "on" another element, it may be directly on the other element or intervening elements may be present therebetween. In contrast, when an element is referred to as being "directly on" another element, there are no intervening elements present.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer, or section. Thus, a first element, component, region, layer, or section discussed below could be termed a second element, component, region, layer, or section without departing from the teachings of the present embodiments.

The terminology used herein is for the purpose of describing present embodiments only and is not intended to be limiting. As used herein, the singular forms "a," "an" and "the" are intended to include the plural forms as well, unless the context clearly indicates otherwise. The term "or" means "and/or." As used herein, the term "and/or" includes any and all combinations of one or more of the associated listed items. Expressions such as "at least one of," when preceding a list of elements, modify the entire list of elements and do not modify the individual elements of the list.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

"Mixture" as used herein is inclusive of all types of combinations, including blends, alloys, solutions, and the like.

As used herein, when a specific definition is not otherwise provided, the term "substituted" refers to a group or compound substituted with at least one substituent including a halogen (—F, —Br, —Cl, or —I), a hydroxy group, a nitro group, a cyano group, an amino group (—NH$_2$, —NH(R$^{100}$) or —N(R$^{101}$)(R$^{102}$), wherein R$^{100}$, R$^{101}$, and R$^{102}$ are the same or different, and are each independently a C1 to C10 alkyl group, an amidino group, a hydrazine group, a hydrazone group, a carboxyl group, an ester group, a ketone group, a substituted or unsubstituted alkyl group, a substituted or unsubstituted alicyclic organic group, a substituted or unsubstituted aryl group, a substituted or unsubstituted alkenyl group, a substituted or unsubstituted alkynyl group, a substituted or unsubstituted heteroaryl group, and a substituted or unsubstituted heterocyclic group, in place of at least one hydrogen of a functional group, or the substituents may be linked to each other to provide a ring.

As used herein, the term "alkyl group" refers to a straight or branched chain saturated aliphatic hydrocarbon having the specified number of carbon atoms and having a valence of at least one. Non-limiting examples of the alkyl group are methyl, ethyl, and propyl.

As used herein, the term "fluoroalkyl group" refers to an alkyl group as defined above, wherein one or more hydrogen atoms are substituted with a fluorine atom. Non-limiting examples of the fluoroalkyl group are fluoromethyl, 2-fluoroethyl, and 3-fluoropropyl.

As used herein, the term "alkoxy group" refers to "alkyl-O—", wherein the term "alkyl" has the same meaning as described above. Non-limiting examples of the alkoxy group are methoxy, ethoxy, propoxy, cyclopropoxy, and cyclohexyloxy.

As used herein, the term "cycloalkyl group" refers to a monovalent group having one or more saturated rings in which all ring members are carbon. Non-limiting examples of the cycloalkyl group are cyclopentyl and cyclohexyl.

As used herein, the term "heterocycloalkyl group" refers to a cycloalkyl group as defined above, wherein one or more of the ring carbon atoms are replaced with a heteroatom selected from O, S, N, P, and Si. Non-limiting example of the heterocycloalkyl group is 2-oxacyclohexyl (2-tetrahydropyranyl).

As used herein, the term "cycloalkoxy group" refers to "cycloalkyl-O—", wherein the term "cycloalkyl" has the same meaning as described above. Non-limiting examples of the cycloalkoxy group are cyclopropoxy and cyclohexyloxy.

As used herein, the term "aryl group", which is used alone or in combination, refers to an aromatic hydrocarbon containing at least one ring. Non-limiting examples of the aryl group are phenyl, naphthyl, and tetrahydronaphthyl.

As used herein, the term "aryloxy group" refers to "aryl-O—", wherein the term "aryl" has the same meaning as described above. Non-limiting examples of the aryloxy group are phenoxy and naphthyloxy.

As used herein, the term "heteroaryl group" refers to an aryl group as defined above, wherein one or more of the ring carbon atoms are replaced with a heteroatom selected from O, S, N, P, and Si. Non-limiting example of the heterocycloalkyl group are 2-pyridyl and 2-furanyl.

As used herein, the terms "alkylene group", "cycloalkylene group", "heterocycloalkylene group", "arylene" group", and "heteroarylene group" refer to a divalent group respectively derived from an alkyl group, a cycloalkyl group, a heterocycloalkyl group, an aryl group, and a heteroaryl group as defined above.

As used herein, when a specific definition is not otherwise provided, the term "alkyl group" refers to a C1 to C30 alkyl group, for example a C1 to C15 alkyl group, the term "fluoroalkyl group" refers to a C1 to C30 fluoroalkyl group, the term "cycloalkyl group" refers to a C3 to C30 cycloalkyl group, for example a C3 to C18 cycloalkyl group, the term "alkoxy group" refer to a C1 to C30 alkoxy group, for example a C1 to C18 alkoxy group, the term "ester group" refers to a C2 to C30 ester group, for example a C2 to C18 ester group, the term "ketone group" refers to a C2 to C30 ketone group, for example a C2 to C18 ketone group, the term "aryl group" refers to a C6 to C30 aryl group, for example a C6 to C18 aryl group, the term "alkenyl group" refers to a C2 to C30 alkenyl group, for example a C2 to C18 alkenyl group, the term "alkynyl group" refers to a C2 to C30 alkynyl group, for example a C2 to C18 alkynyl group, the term "alkylene group" refers to a C1 to C30 alkylene group, for example a C1 to C18 alkylene group, the term "cycloalkylene group" refers to a C3 to C30 cycloalkylene group, and the term "arylene group" refers to a C6 to C30 arylene group, for example a C6 to C16 arylene group.

As used herein, when a specific definition is not otherwise provided, the term "aliphatic" refers to a C1 to C30 alkyl group, a C2 to C30 alkenyl group, a C2 to C30 alkynyl group, a C1 to C30 alkylene group, a C2 to C30 alkenylene group, or a C2 to C30 alkynylene group, for example a C1 to C15 alkyl group, a C2 to C15 alkenyl group, a C2 to C15 alkynyl group, a C1 to C15 alkylene group, a C2 to C15 alkenylene group, or a C2 to C15 alkynylene group, the term "alicyclic organic group" refers to a C3 to C30 cycloalkyl group, a C3 to C30 cycloalkenyl group, a C3 to C30 cycloalkynyl group, a C3 to C30 cycloalkylene group, a C3 to C30 cycloalkenylene group, or a C3 to C30 cycloalkynylene group, for example a C3 to C15 cycloalkyl group, a C3 to C15 cycloalkenyl group, a C3 to C15 cycloalkynyl group, a C3 to C15 cycloalkylene group, a C3 to C15 cycloalkenylene group, or a C3 to C15 cycloalkynylene group.

As used herein when a definition is not otherwise provided, the term "aromatic organic group" refers to a C6 to C30 group comprising one aromatic ring, two or more aromatic rings fused together to provide a condensed ring system, or two or more aromatic rings independently selected from the foregoing (a single aromatic ring or a condensed ring system) linked through a single bond or through a functional group selected from a fluorenylene group, —O—, —S—, —C(=O)—, —CH(OH)—, —S(=O)$_2$—, —Si(CH$_3$)$_2$—, —(CH$_2$)$_p$—, wherein 1≤q≤10, —C(CF$_2$)$_q$—, wherein 1≤q≤10, —C(CH$_3$)$_2$—, —C(CF$_3$)$_2$—, and —C(=O)NH—, for example through —S(=O)$_2$—, for example an aryl group or a C6 to C30 arylene group, for example a C6 to C16 aryl group or a C6 to C16 arylene group such as phenylene. An example of an aromatic organic group is a fluorenylene group.

As used herein, when a specific definition is not otherwise provided, the term "heterocyclic group" refers to a C2 to C30 cycloalkyl group, a C2 to C30 cycloalkylene group, a C2 to C30 cycloalkenyl group, a C2 to C30 cycloalkenylene group, a C2 to C30 cycloalkynyl group, a C2 to C30 cycloalkynylene group, a C2 to C30 heteroaryl group, or a C2 to C30 heteroarylene group including 1 to 3 heteroatoms selected from O, S, N, P, Si, and a combination thereof in one ring, for example a C2 to C15 cycloalkyl group, a C2 to C15 cycloalkylene group, a C2 to C15 cycloalkenyl group, a C2 to C15 cycloalkenylene group, a C2 to C15 cycloalkynyl group, a C2 to C15 cycloalkynylene group, a C2 to C15 heteroaryl group, or a C2 to C15 heteroarylene group including 1 to 3 heteroatoms selected from O, S, N, P, Si, and a combination thereof, in one ring.

As used herein, when a definition is not otherwise provided, "combination" commonly refers to mixing or copolymerization.

In addition, in the specification, the mark "*" may refer to a point of attachment to another atom.

According to an embodiment, provided is a composition for preparing a poly(imide-benzoxazole) copolymer, including:
a tetracarboxylic acid dianhydride represented by Chemical Formula 1,
a first diamine represented by Chemical Formula 2, and
a second diamine represented by Chemical Formula 3:

Chemical Formula 1
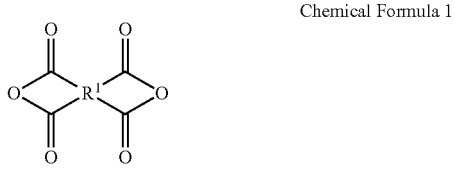

Chemical Formula 2

Chemical Formula 3
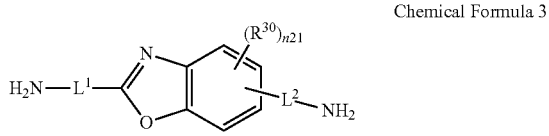

wherein in Chemical Formulae 1 and 2,
$R^1$ and $R^2$ are the same or different, and are each independently a substituted or unsubstituted C4 to C30 alicyclic organic group, or a substituted or unsubstituted C6 to C30 aromatic organic group, wherein the aromatic organic group includes one aromatic ring, two or more aromatic rings fused together to provide a condensed ring system, or two or more aromatic rings linked through a single bond or through a functional group selected from a fluorenylene group, —O—, —S—, —C(=O)—, —CH(OH)—, —S(=O)$_2$—, —Si(CH$_3$)$_2$—, —(CH$_2$)$_p$— wherein 1≤p≤10, —(CF$_2$)$_q$— wherein 1≤q≤10, —C(CH$_3$)$_2$—, —C(CF$_3$)$_2$—, —C(=O)NH—, a substituted or unsubstituted C3 to C10 cycloalkylene group, a substituted or unsubstituted C6 to C15 arylene group, and a combination thereof,
wherein in Chemical Formula 3,
$L^1$ and $L^2$ are the same or different, and are each independently selected from a substituted or unsubstituted C1 to C30 aliphatic organic group, a substituted or unsubstituted C3 to C30 alicyclic organic group, a substituted or unsubstituted C6 to C30 aromatic organic group, a substituted or unsubstituted C3 to C30 heterocycloalkylene group, —O—, —S—, —C(=O)—, —CH(OH)—, —S(=O)$_2$—, —Si(CH$_3$)$_2$—, —(CH$_2$)$_p$— wherein 1≤p≤10, —(CF$_2$)$_q$— wherein 1≤q≤10, —C(CF$_3$)$_2$—, —C(=O)NH—, and a combination thereof, $R^{30}$ is a substituted or unsubstituted C1 to C30 alkyl group, a substituted or unsubstituted C2 to C30 alkenyl group, a substituted or unsubstituted C2 to C30 alkynyl group, a substituted or unsubstituted C1 to C30 alkoxy group, a substituted or unsubstituted C3 to C30 cycloalkyl group, a substituted or unsubstituted C2 to C30 heterocycloalkyl group, a substituted or unsubstituted C1 to C30 heteroalkyl group, a substituted or unsubstituted C7 to C20 arylakyl group, a substituted or unsubstituted C6 to C30 aryl group, a substituted or unsubstituted C1 to C30 acyl group, a hydroxy group, a nitro group, a halogen, and a combination thereof, and n21 is an integer from 0 to 3.

Studies for providing light in weight, flexible, and bendable mobile devices, such as smart phones and tablet PCs, are ongoing. In this regard, transparent and flexible window films having high hardness are desired to replace hard glass disposed on the uppermost place of the mobile devices.

In order to be used as a window film, transparent films should have high hardness and good optical properties. Although hardness may be supplemented by coating a hardcoating layer on the film, high tension modulus of the film may be helpful to increase hardness of the final film. Additionally desired optical properties may include high transmittance for light, low haze, low yellowness index (YI), and the like.

Poly(imide-amide) copolymer has good mechanical, thermal, optical properties, and the like, and thus may be used as a substrate for display device, such as an organic light emitting diode ("OLED"), liquid crystal display ("LCD"), and the like. In order to use such a poly(imide-amide) copolymer as a window film for flexible display device, mechanical and optical properties, such as, hardness (or modulus), low YI, and the like, should further be improved. However, modulus and YI are in so-called "trade-off" relation, and thus it is very difficult to improve the two properties at the same time.

The inventors have found that a novel composition for preparing a polyimide including a diamine derived from a benzoxazole increases tension modulus of an article containing the polyimide, while at the same time, maintaining excellent optical properties of polyimide, for example, low YI.

Particularly, the composition includes a tetracarboxylic acid dianhydride represented by Chemical Formula 1, a diamine represented by Chemical Formula 2, and a diamine represented by Chemical Formula 3, which includes a benzoxazole group.

As shown in the examples, by adding a diamine including a benzoxazole group to the composition for preparing polyimide, the tension modulus of the film prepared from the composition unexpectedly improves, while the yellowness index (YI) of the film is maintained or slightly increased.

Accordingly, the tetracarboxylic acid dianhydride represented by Chemical Formula 1 may be any dianhydride used to prepare a conventional polyimide.

For example, the tetracarboxylic acid dianhydride represented by Chemical Formula 1 may be one or more selected from 3,3',4,4'-biphenyltetracarboxylic dianhydride ("BPDA"), bicyclo[2.2.2]oct-7-ene-2,3,5,6-tetracarboxylic dianhydride ("BTDA"), 3,3',4,4'-diphenylsulfone tetracarboxylic dianhydride ("DSDA"), 4,4'-(hexafluoroisopropylidene)diphthalic anhydride ("6FDA"), 4,4'-oxydiphthalic anhydride ("ODPA"), pyromellitic dianhydride ("PMDA"), and 4-(2,5-dioxotetrahydrofuran-3-yl)-1,2,3,4-tetrahydronaphthalene-1,2-dicarboxylic anhydride ("DTDA"), and it is not limited thereto.

In an exemplary embodiment, the tetracarboxylic acid dianhydride represented by Chemical Formula 1 may be 3,3',4,4'-biphenyl tetracarboxylic dianhydride ("BPDA"), 4,4'-(hexafluoroisopropylidene)diphthalic anhydride ("6FDA"), or a combination thereof.

Also, the diamine represented by Chemical Formula 2 may be any diamine used for preparing a conventional polyimide.

The diamine represented by Chemical Formula 2 may be one or more selected from the following chemical formulae:

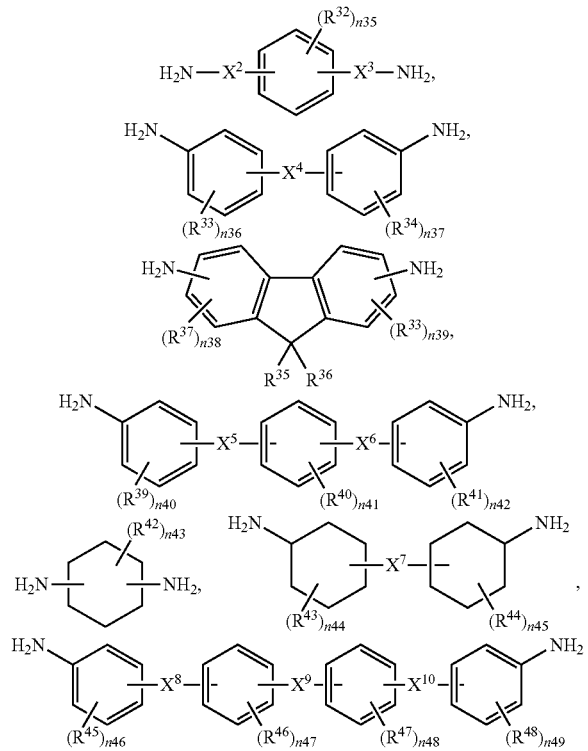

In the above chemical formulae, $R^{32}$ to $R^{45}$ are the same or different and may each independently be hydrogen, a halogen, a nitro group, a substituted or unsubstituted C1 to C15 alkyl group, a substituted or unsubstituted C1 to C15 alkoxy group, a substituted or unsubstituted C1 to C15 fluoroalkyl group, a substituted or unsubstituted C3 to C15 cycloalkyl group, a substituted or unsubstituted C3 to C15 heterocycloalkyl group, a substituted or unsubstituted C3 to C15 cycloalkoxy group, a substituted or unsubstituted C6 to C15 aryl group, a substituted or unsubstituted C6 to C15 aryloxy group, or a substituted or unsubstituted C2 to C15 heteroaryl group, $X^2$ to $X^{10}$ are the same or different and may each independently be a single bond, a substituted or unsubstituted C1 to C10 alkylene group, a substituted or unsubstituted C3 to C10 cycloalkylene group, a substituted or unsubstituted C5 to C40 heterocycloalkylene group, a substituted or unsubstituted C6 to C15 arylene group, a substituted or unsubstituted C3 to C40 heteroarylene group, —$SO_2$—, —O—, —C(=O)—, or a combination thereof, n35 to n37, and n40 to n49, are integers ranging from 0 to 4, and n38 and n39 are integers ranging from 0 to 3.

For example, the first diamine represented by Chemical Formula 2 may be one or more selected from 2,2'-bis(trifluoromethyl)benzidine ("TFDB"), 4,4'-diaminodiphenyl sulfone ("DADPS"), 4,4'-(9-fluorenylidene)dianiline ("BAPF"), bis(4-(4-aminophenoxy)phenyl)sulfone ("BAPS"), 2,2',5,5'-tetrachlorobenzidine, 2,7-diaminofluorene, 1,1-bis(4-aminophenyl)cyclohexane, 4,4'-methylenebis-(2-methylcyclohexylamine), 4,4-diaminooctafluorobiphenyl, 3,3'-dihydroxybenzidine, and 1,3-cyclohexanediamine, but is not limited thereto.

In an exemplary embodiment, the first diamine represented by Chemical Formula 2 may be 2,2'-bis(trifluoromethyl)benzidine ("TFDB").

In Chemical Formula 3,
$L^1$ maybe phenylene group,
$L^2$ may be a single bond, and
n21 may be 0, and it is not limited thereto.

The mole ratio of the tetracarboxylic acid dianhydride represented by Chemical Formula 1 to the first diamine represented by Chemical Formula 2 and the second diamine represented by Chemical Formula 3 may be about 1:1, where the second diamine represented by Chemical Formula 3 may be included in an amount of less than 10 mole percent (mol %) based on the total mole number of the diamines represented by Chemical Formula 2 and Chemical Formula 3.

Within the above range of the diamine represented by Chemical Formula 3 based on the total mole number of the diamines represented by Chemical Formula 2 and Chemical Formula 3, an article prepared from the composition may have improved tension modulus, while good optical properties, for example, low YI, are maintained.

Within the above range, the diamine represented by Chemical Formula 3 may be included in an amount of about 0.1 mol % to about 8 mol %, for example, about 0.5 mol % to about 7 mol %, for example, about 1 mol % to about 5 mol %, for example, about 1 mol % to about 3 mol %, based on the total mole number of the diamines represented by Chemical Formula 2 and Chemical Formula 3.

In an exemplary embodiment, the tetracarboxylic acid dianhydride represented by Chemical Formula 1 may include a mixture of about 10 mol % to about 55 mol % of 3,3',4,4'-biphenyl tetracarboxylic dianhydride ("BPDA") and about 90 mol % to about 45 mol % of 4,4'-(hexafluoroisopropylidene)diphthalic anhydride ("6FDA"), where the diamine represented by Chemical Formula 2 may be 2,2'-bis(trifluoromethyl)benzidine ("TFDB").

According to another embodiment, provided is a poly(imide-benzoxazole) copolymer prepared from the composition for preparing poly(imide-benzoxazole) copolymer.

The poly(imide-benzoxazole) copolymer may include:
(i) a structural unit represented by Chemical Formula 4, Chemical Formula 5, or a combination thereof; and
(ii) a structural unit represented by Chemical Formula 6, Chemical Formula 7, or a combination thereof:

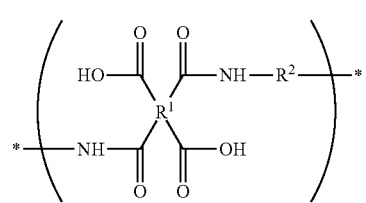

Chemical Formula 4

Chemical Formula 5

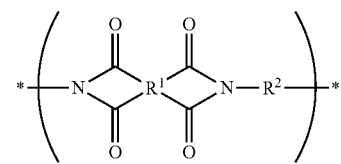

Chemical Formula 6

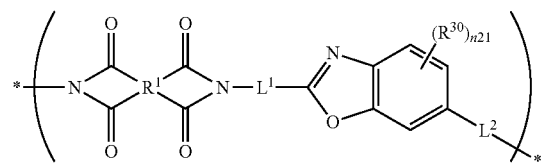

Chemical Formula 7

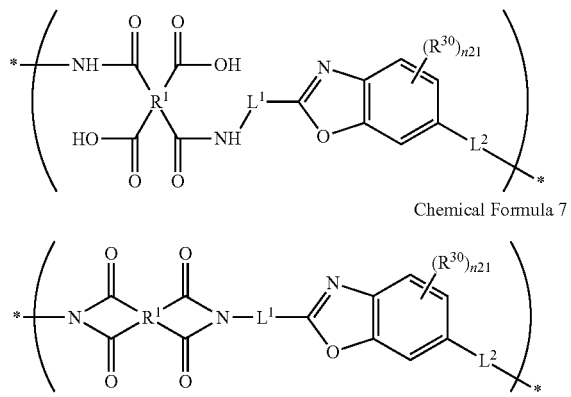

wherein in Chemical Formulae 4 to 7,

R¹ and R² are the same or different, and are each independently a substituted or unsubstituted C4 to C30 alicyclic organic group, or a substituted or unsubstituted C6 to C30 aromatic organic group, wherein the aromatic organic group includes one aromatic ring, two or more aromatic rings fused together to provide a condensed ring system, or two or more aromatic rings linked through a single bond or through a functional group selected from a fluorenylene group, —O—, —S—, —C(=O)—, —CH(OH)—, —S(=O)$_2$—, —Si(CH$_3$)$_2$—, —(CH$_2$)$_p$— wherein 1≤p≤10, —(CF$_2$)$_q$— wherein 1≤q≤10, —C(CH$_3$)$_2$—, —C(CF$_3$)$_2$—, —C(=O)NH—, a substituted or unsubstituted C3 to C10 cycloalkylene group, a substituted or unsubstituted C6 to C15 arylene group, and a combination thereof, L¹ and L² are the same or different, and are each independently selected from a substituted or unsubstituted C1 to C30 aliphatic organic group, a substituted or unsubstituted C3 to C30 alicyclic organic group, a substituted or unsubstituted C6 to C30 aromatic organic group, a substituted or unsubstituted C3 to C30 heterocycloalkylene group, —O—, —S—, —C(=O)—, —CH(OH)—, —S(=O)$_2$—, —Si(CH$_3$)$_2$—, —(CH$_2$)$_p$— wherein 1≤p≤10, —(CF$_2$)$_q$— wherein 1≤q≤10, —C(CF$_3$)$_2$—, —C(=O)NH—, and a combination thereof, R³⁰ is a substituted or unsubstituted C1 to C30 alkyl group, a substituted or unsubstituted C2 to C30 alkenyl group, a substituted or unsubstituted C2 to C30 alkynyl group, a substituted or unsubstituted C1 to C30 alkoxy group, a substituted or unsubstituted C3 to C30 cycloalkyl group, a substituted or unsubstituted C2 to C30 heterocycloalkyl group, a substituted or unsubstituted C1 to C30 heteroalkyl group, a substituted or unsubstituted C7 to C20 arylakyl group, a substituted or unsubstituted C6 to C30 aryl group, a substituted or unsubstituted C1 to C30 acyl group, a hydroxy group, a nitro group, a halogen, and a combination thereof, and n21 is an integer from 0 to 3.

R¹ in Chemical Formulae 4 to 7 may be represented by Chemical Formula 8 or Chemical Formula 9:

Chemical Formula 8

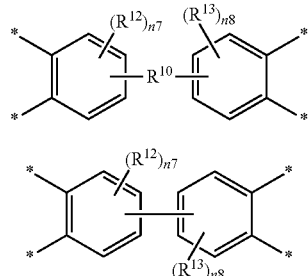

Chemical Formula 9

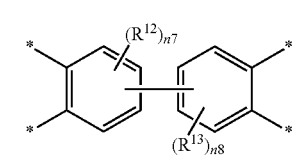

In Chemical Formula 8,

R¹⁰ is the same or different in each structural unit, and is independently a single bond, a substituted or unsubstituted C1 to C30 aliphatic organic group, a substituted or unsubstituted C3 to C30 cyclic organic group, a substituted or unsubstituted C6 to C30 aromatic organic group, or a substituted or unsubstituted C2 to C30 heterocyclic group, wherein in Chemical Formulae 8 and 9, R¹² and R¹³ are the same or different, and are independently a halogen, a hydroxy group, a substituted or unsubstituted C1 to C10 aliphatic organic group, a substituted or unsubstituted C6 to C20 aromatic organic group, an alkoxy group of formula —OR²⁰⁸, wherein R²⁰⁸ is a C1 to C10 aliphatic organic group, or a silyl group of formula —SiR²⁰⁹R²¹⁰R²¹¹, wherein R²⁰⁹, R²¹⁰, and R²¹¹ are the same or different, and are independently hydrogen or a C1 to C10 aliphatic organic group, and n7 and n8 are independently integers ranging from 0 to 3.

In Chemical Formula 4 or Chemical Formula 5, R² may be represented by one or more selected from Chemical Formulae 10 to 12:

Chemical Formula 10

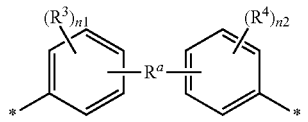

In Chemical Formula 10,

R$^a$ is the same or different in each structural unit, and is independently a substituted or unsubstituted C3 to C30 alicyclic organic group, a substituted or unsubstituted C6 to C30 aromatic organic group, or a substituted or unsubstituted C2 to C30 heterocyclic group, or a substituted or unsubstituted C13 to C20 fluorenylene group, R³ and R⁴ are the same or different, and are independently a halogen, a hydroxy group, a substituted or unsubstituted C1 to C10 aliphatic organic group, a C6 to C20 aromatic organic group, an alkoxy group of formula —OR²⁰⁰, wherein R²⁰⁰ is a C1 to C10 aliphatic organic group, or a silyl group of formula —SiR²⁰¹R²⁰²R²⁰³, wherein R²⁰¹, R²⁰², and R²⁰³ are the same or different, and are independently hydrogen or a C1 to C10 aliphatic organic group, and n1 and n2 are independently integers ranging from 0 to 4.

Chemical Formula 11

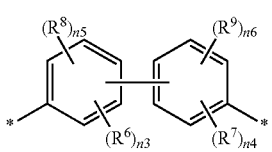

In Chemical Formula 11, $R^6$ and $R^7$ are the same or different and each are independently an electron withdrawing group selected from —$CF_3$, —$CCl_3$, —$CBr_3$, —$CI_3$, —F, —Cl, —Br, —I, —$NO_2$, —CN, —$COCH_3$, and —$CO_2C_2H_5$, $R^8$ and $R^9$ are the same or different, and each are independently a halogen, a hydroxy group, a substituted or unsubstituted C1 to C10 aliphatic organic group, a substituted or unsubstituted C6 to C20 aromatic organic group, an alkoxy group of formula —$OR^{204}$, wherein $R^{204}$ is a C1 to C10 aliphatic organic group, or a silyl group of formula —$SiR^{205}R^{206}R^{207}$, wherein $R^{205}$, $R^{206}$, and $R^{207}$ are the same or different, and each are independently a hydrogen, a C1 to C10 aliphatic organic group, n3 is an integer ranging from 1 to 4, n5 is an integer ranging from 0 to 3, provided that n3+n5 is an integer ranging from 1 to 4, n4 is an integer ranging from 1 to 4, and n6 is an integer ranging from 0 to 3, provided that n4+n6 is an integer ranging from 1 to 4.

Chemical Formula 12

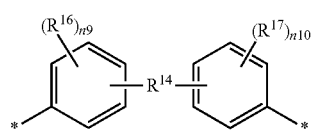

In Chemical Formula 12, $R^{14}$ is O, S, C(=O), CH(OH), S(=O)$_2$, Si(CH$_3$)$_2$, (CH$_2$)$_p$ wherein 1≤p≤10, (CF$_2$)$_q$ wherein 1≤q≤10, C(CH$_3$)$_2$, C(CF$_3$)$_2$, C(=O)NH, or a substituted or unsubstituted C6 to C30 aromatic organic group, wherein the aromatic organic group includes one aromatic ring, two or more aromatic rings fused together to provide a condensed ring system, or two or more aromatic rings linked through a single bond or through a functional group selected from a fluorenylene group, O, S, C(=O), CH(OH), S(=O)$_2$, Si(CH$_3$)$_2$, (CH$_2$)$_p$ wherein 1≤p≤10, (CF$_2$)$_q$ wherein 1≤q≤10, C(CH$_3$)$_2$, C(CF$_3$)$_2$, and C(=O)NH, $R^{16}$ and $R^{17}$ are the same or different, and each are independently a halogen, a hydroxy group, a substituted or unsubstituted C1 to C10 aliphatic organic group, a substituted or unsubstituted C6 to C20 aromatic organic group, an alkoxy group of formula —$OR^{212}$, wherein $R^{212}$ is a C1 to C10 aliphatic organic group, or a silyl group of formula —$SiR^{213}R^{214}R^{215}$, wherein $R^{213}$, $R^{214}$, and $R^{215}$ are the same or different, and each are independently a hydrogen or a C1 to C10 aliphatic organic group, and n9 and n10 are each independently an integer ranging from 0 to 4.

$R^1$ in Chemical Formulae 4 to 7 may be represented by Chemical Formula 8 and Chemical Formula 9, where n7 and n8 is 0, and $R^{10}$ is C(CF$_3$)$_2$.

$R^2$ in Chemical Formula 4 and Chemical Formula 5 may be represented by Chemical Formula 13:

Chemical Formula 13

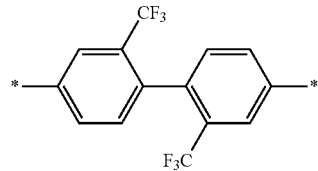

In Chemical Formula 6 and Chemical Formula 7, $L^1$ may be a phenylene group, $L^2$ may be a single bond, and n21 may be 0.

The structural unit represented by Chemical Formula 6, Chemical Formula 7, or a combination thereof may be included in an amount of less than about 10 mol % based on the total mole number of the structural units included in the poly(imide-benzoxazole) copolymer.

$R^1$ may include the structural unit represented by Chemical Formula 8 in an amount of about 90 mol % to about 45 mol %, and the structural unit represented by Chemical Formula 9 in an amount of about 10 mol % to about 55 mol % in the poly(imide-benzoxazole) copolymer.

The poly(imide-benzoxazole) copolymer may further include one or more selected from the structural unit represented by Chemical Formulae 14 to 17:

Chemical Formula 14

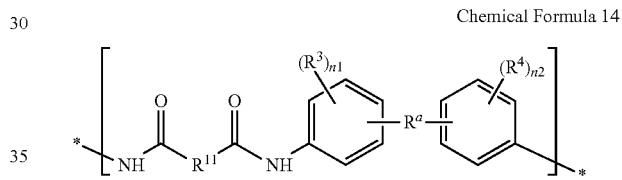

In Chemical Formula 14, $R^a$ is a substituted or unsubstituted C3 to C30 alicyclic organic group, a substituted or unsubstituted C6 to C30 aromatic organic group, a substituted or unsubstituted C2 to C30 heterocyclic group, or a substituted or unsubstituted C13 to C20 fluorenylene group, $R^{11}$ is a substituted or unsubstituted C6 to C30 aromatic organic group, $R^3$ and $R^4$ are the same or different and each are independently a halogen, a hydroxy group, a substituted or unsubstituted C1 to C10 aliphatic organic group, a substituted or unsubstituted C6 to C20 aromatic organic group, an alkoxy group of formula —$OR^{200}$, wherein $R^{200}$ is a C1 to C10 aliphatic organic group, a silyl group of formula —$SiR^{201}R^{202}R^{203}$, wherein $R^{201}$, $R^{202}$, and $R^{203}$ are the same or different and each are independently a hydrogen, or a C1 to C10 aliphatic organic group, and n1 and n2 are the same or different and each are independently an integer ranging from 0 to 4.

Chemical Formula 15

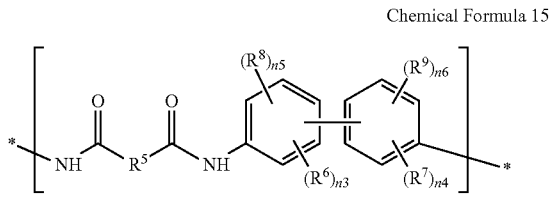

In Chemical Formula 15,

R$^5$ is a substituted or unsubstituted C6 to C30 aromatic organic group,

R$^6$ and R$^7$ are the same or different and each are independently an electron withdrawing group selected from —CF$_3$, —CCl$_3$, —CBr$_3$, —Cl$_3$, —F, —Cl, —Br, —I, —NO$_2$, —CN, —COCH$_3$, and —CO$_2$C$_2$H$_5$, R$^8$ and R$^9$ are the same or different, and each are independently a halogen, a hydroxy group, a substituted or unsubstituted C1 to C10 aliphatic organic group, a substituted or unsubstituted C6 to C20 aromatic organic group, an alkoxy group of formula —OR$^{204}$, wherein R$^{204}$ is a C1 to C10 aliphatic organic group, or a silyl group of formula —SiR$^{205}$R$^{206}$R$^{207}$, wherein R$^{205}$, R$^{206}$, and R$^{207}$ are the same or different, and each are independently a hydrogen, a C1 to C10 aliphatic organic group, n3 is an integer ranging from 1 to 4, n5 is an integer ranging from 0 to 3, provided that n3+n5 is an integer ranging from 1 to 4, n4 is an integer ranging from 1 to 4, and n6 is an integer ranging from 0 to 3, provided that n4+n6 is an integer ranging from 1 to 4.

Chemical Formula 16

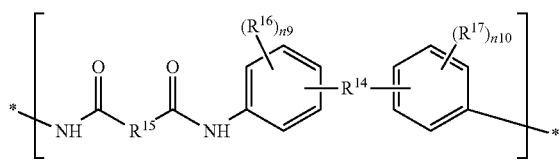

In Chemical Formula 16,

R$^{14}$ is O, S, C(=O), CH(OH), S(=O)$_2$, Si(CH$_3$)$_2$, (CH$_2$)$_p$ wherein 1≤p≤10, (CF$_2$)$_q$ wherein 1≤q≤10, C(CH$_3$)$_2$, C(CF$_3$)$_2$, C(=O)NH, or a substituted or unsubstituted C6 to C30 aromatic organic group, wherein the aromatic organic group includes one aromatic ring, two or more aromatic rings fused together to provide a condensed ring system, or two or more aromatic rings linked through a single bond or through a functional group selected from a fluorenylene group, O, S, C(=O), CH(OH), S(=O)$_2$, Si(CH$_3$)$_2$, (CH$_2$)$_p$ wherein 1≤p≤10, (CF$_2$)$_q$ wherein 1≤q≤10, C(CH$_3$)$_2$, C(CF$_3$)$_2$, and C(=O)NH, R$^{15}$ is a substituted or unsubstituted C6 to C30 aromatic organic group, R$^{16}$ and R$^{17}$ are the same or different, and each are independently a halogen, a hydroxy group, a substituted or unsubstituted C1 to C10 aliphatic organic group, a substituted or unsubstituted C6 to C20 aromatic organic group, an alkoxy group of formula —OR$^{212}$, wherein R$^{212}$ is a C1 to C10 aliphatic organic group, or a silyl group of formula —SiR$^{213}$R$^{214}$R$^{215}$, wherein R$^{213}$, R$^{214}$, and R$^{215}$ are the same or different, and each are independently a hydrogen or a C1 to C10 aliphatic organic group, and n9 and n10 are each independently an integer ranging from 0 to 4.

Chemical Formula 17

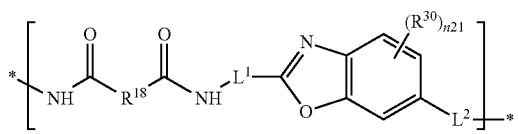

In Chemical Formula 17,

R$^{18}$ is O, S, C(=O), CH(OH), S(=O)$_2$, Si(CH$_3$)$_2$, (CH$_2$)$_p$ wherein 1≤p≤10, (CF$_2$)$_c$, wherein 1≤q≤10, C(CH$_3$)$_2$, C(CF$_3$)$_2$, C(=O)NH, or a substituted or unsubstituted C6 to C30 aromatic organic group, wherein the aromatic organic group includes one aromatic ring, two or more aromatic rings fused together to provide a condensed ring system, or two or more aromatic rings linked through a single bond or through a functional group selected from a fluorenylene group, O, S, C(=O), CH(OH), S(=O)$_2$, Si(CH$_3$)$_2$, (CH$_2$)$_p$ wherein 1≤p≤10, (CF$_2$)$_q$ wherein 1≤q≤10, C(CH$_3$)$_2$, C(CF$_3$)$_2$, and C(=O)NH, L$^1$ and L$^2$ are the same or different, and are each independently selected from a substituted or unsubstituted C1 to C30 aliphatic organic group, a substituted or unsubstituted C3 to C30 alicyclic organic group, a substituted or unsubstituted C6 to C30 aromatic organic group, a substituted or unsubstituted C3 to C30 heterocycloalkylene group, —O—, —S—, —C(=O)—, —CH(OH)—, —S(=O)$_2$—, —Si (CH$_3$)$_2$—, —(CH$_2$)$_p$— wherein 1≤p≤10, —(CF$_2$)$_q$— wherein 1≤q≤10, —C(CF$_3$)$_2$—, —C(=O)NH—, and a combination thereof, R$^{30}$ is a substituted or unsubstituted C1 to C30 alkyl group, a substituted or unsubstituted C2 to C30 alkenyl group, a substituted or unsubstituted C2 to C30 alkynyl group, a substituted or unsubstituted C1 to C30 alkoxy group, a substituted or unsubstituted C3 to C30 cycloalkyl group, a substituted or unsubstituted C2 to C30 heterocycloalkyl group, a substituted or unsubstituted C1 to C30 heteroalkyl group, a substituted or unsubstituted C7 to C20 arylakyl group, a substituted or unsubstituted C6 to C30 aryl group, a substituted or unsubstituted C1 to C30 acyl group, a hydroxy group, a nitro group, a halogen, and a combination thereof, and n21 is an integer from 0 to 3.

The structural unit represented by one or more of Chemical Formulae 14 to 17 is an amide structural unit, and the copolymer further including one or more of the structural units represented by Chemical Formulae 14 to 17 may be a poly(imide-benzoxazole-amide) copolymer.

The structural unit represented by one or more of Chemical Formulae 14 to 17 may be included in an amount of about 1 mol % to about 99 mol %, for example, about 5 mol % to about 95 mol %, for example, about 10 mol % to about 90 mol %, for example, about 20 mol % to about 80 mol %, for example, about 30 mol % to about 70 mol %, for example, about 40 mol % to about 60 mol %, based on the total mole number of the structural units.

The poly(imide-benzoxazole) copolymer or poly(imide-benzoxazole-amide) copolymer according to an embodiment may be prepared by various methods for preparing polyimide or poly(imide-amide) known by a person having ordinary skills in the related arts, which are not limited to the methods disclosed herein.

For example, according to a method of synthesis of a polyimide, an imide is generally prepared by using a method of preparing an amic acid, which is a precursor of the imide. Subsequently, the amic acid is imidized to produce the imide. For example, an amic acid, the precursor of the imide, may be prepared by reacting a tetracarboxylic acid dianhydride and a diamine, and may be converted to the polyimide by thermal or chemical imidization.

In an exemplary embodiment, the poly(imide-benzoxazole) copolymer according to an embodiment may be prepared by reacting a tetracarboxylic acid dianhydride represented by Chemical Formula 1 with the diamines represented by Chemical Formula 2 and Chemical Formula 3 in an aprotic bipolar solvent in the same way as in a method of preparing a conventional polyimide.

That is, the poly(imide-benzoxazole) copolymer according to an embodiment may be prepared by, for example, the method as described above, in which a tetracarboxylic acid dianhydride represented by Chemical Formula 1, for example, one or more selected from 3,3',4,4'-biphenyltetracarboxylic dianhydride ("BPDA"), bicyclo[2.2.2]oct-7-ene-2,3,5,6-tetracarboxylic dianhydride ("BTDA"), 3,3',4,4'-diphenylsulfone tetracarboxylic dianhydride ("DSDA"), 4,4'-(hexafluoroisopropylidene)diphthalic anhydride ("6FDA"), 4,4'-oxydiphthalic anhydride ("ODPA"), pyromellitic dianhydride ("PMDA"), 4-(2,5-dioxotetrahydrofuran-3-yl)-1,2,3,4-tetrahydronaphthalene-1,2-dicarboxylic anhydride ("DTDA"), and bis(3,4-dicarboxyphenyl)sulfone dianhydride, is reacted with a diamine represented by Chemical Formula 2, for example, one or more selected from 2,2'-bis(trifluoromethyl)benzidine ("TFDB"), 4,4'-diaminodiphenyl sulfone ("DADPS"), 4,4'-(9-fluorenylidene)dianiline ("BAPF"), bis(4-(4-aminophenoxy)phenyl)sulfone ("BAPS"), 2,2',5,5'-tetrachlorobenzidine, 2,7-diaminofluorene, 1,1-bis(4-aminophenyl)cyclohexane, 4,4'-methylenebis-(2-methylcyclohexylamine), 4,4-diaminooctafluorobiphenyl, and 3,3'-dihydroxybenzidine, 1,3-cyclohexanediamine, together with a diamine represented by Chemical Formula 3 including a benzoxazole group.

The aprotic bipolar solvent may include, for example, a sulfoxide solvent such as dimethyl sulfoxide and diethyl sulfoxide, a formamide solvent such as N,N-dimethyl formamide and N,N-diethyl formamide, an acetamide solvent such as N,N-dimethyl acetamide and N,N-diethyl acetamide, a pyrrolidone solvent such as N-methyl-2-pyrrolidone and N-vinyl-2-pyrrolidone, a phenol solvent such as phenol, o-, m-, or p-cresol, xylenol, halogenated phenol, and catechol, hexamethyl phosphoramide, γ-butyrolactone, or a mixture thereof. However, this disclosure is not limited to these solvents, and an aromatic hydrocarbon such as xylene and toluene may also be used. Also, to promote the dissolution of a polymer, an alkali metal salt or an alkaline earth metal salt may be further added to the solvent in an amount of about 50 percent by weight (wt %) or less based on the total amount of the solvent.

A person skilled in the art would readily understand that the amount and type of the tetracarboxylic acid dianhydride and the diamines may be appropriately selected according to a given (e.g., desired, or alternatively, predetermined) composition or use.

When preparing the amic acid, if the diamines are used to exceed the tetracarboxylic acid dianhydride, the obtained copolymer may have an amino group at an end.

Meanwhile, if the composition further includes one or more of the structural units represented by Chemical Formulae 14 to 17, monomers for preparing a polyamide may be first added to produce the polyamide, and then the monomers for preparing a poly(amic acid-benzoxazole) may be added thereto to produce the poly(imide-benzoxazole-amide) copolymer.

When preparing poly(imide-amide) or poly(imide-benzoxazole-amide) copolymer, it may be advantageous to add the monomers for preparing an amide first, and then to add the monomer for preparing an amic acid or imide. If the amic acid-benzoxazole is first polymerized, monomers for preparing amide may further react with functional groups of amic acid-benzoxazole to produce gel.

Methods for preparing polyamide may include, for example, a low temperature solution polymerization method, an interface polymerization method, a fusion polymerization method, a solid polymerization method, and the like, but is not limited thereto.

Among the methods, for example, a low-temperature solution polymerization method for preparing polyamide is further described. According to the low-temperature solution polymerization method, a polyamide is prepared by polymerizing a dicarboxylic acid dichloride and a diamine in an aprotic bipolar solvent.

Herein, in order to produce the poly(imide-benzoxazole-amide) copolymer, a dicarboxylic acid dichloride and a diamine capable of producing a structural unit represented by at least one of Chemical Formulae 14 to 17 may be used, and the diamine monomer may be the same as those used for preparing the poly(imide-benzoxazole) copolymer. The dicarboxylic acid dichloride may be selected from any one used for preparing the polyamide. For example, the dicarboxylic acid dichloride may include terephthaloyl chloride ("TPCl"), isophthaloyl chloride ("IPCl"), biphenyl dicarbonyl chloride ("BPCl"), naphthalene dicarbonyl chloride, terphenyl dicarbonyl chloride, 2-fluoro-terephthaloyl chloride, and a combination thereof, but is not limited thereto.

As described above, according to an exemplary embodiment, the poly(imide-benzoxazole) copolymer is first polymerized, and in this case, poly(imide-benzoxazole) copolymer having amino group at each end thereof may be obtained by using excess diamine compared to tetracarboxylic acid dianhydride. Accordingly, the poly(imide-benzoxazole-amide)copolymer may be prepared by adding the above-mentioned monomers for preparing polyamide, that is, the dicarboxylic acid dichloride and additional diamine monomers, to the obtained poly(imide-benzoxazole) copolymer, which has amino group at each end.

A molecular weight of the poly(imide-benzoxazole-imide) copolymer according to an embodiment may be adjusted appropriately according to its use, and thus an oligomer or high molecular weight polymer may be obtained.

According to yet another embodiment, provided is an article prepared from the poly(imide-benzoxazole) copolymer according to an embodiment. The article may be a film, fiber, or coating or adhesive material.

The article may be formed using the poly(imide-benzoxazole) copolymer through a dry-wet method, a dry method, or a wet method, but this disclosure is not limited thereto.

According to an exemplary embodiment when the article is a film, the film may be manufactured using the copolymer through the dry-wet method, where a layer is formed by extruding a solution dissolving the poly(imide-benzoxazole) copolymer from a mouth piece on a supporter, such as drum or an endless belt, drying the layer, and evaporating the solvent out of the layer until the layer has a self-maintenance property. The drying may be performed at about 25° C. to about 300° C. for about 1 hour or less. When the surface of the drum and/or the endless belt used for the drying process becomes flat, a layer with a flat surface is formed. The layer obtained after the drying process is delaminated from the supporter, and treated according to a wet process, desalted and/or desolventized. The manufacturing of the film is completed as the layer is elongated, dried, and/or heat treated.

The elongating conforms to a draw ratio, which may range from about 0.8 to about 8 in terms of surface ratio. According to an embodiment, the draw ratio may range from about 1.3 to about 8. As used herein, the term "surface ratio" refers to a value obtained by dividing the area of a layer after the elongating, by an area of the layer before the elongating. A value of 1 or less denotes a relaxed state. According to an exemplary embodiment, the elongating may be performed not only in a surface direction but also in a thickness direction.

The heat treatment may be performed at a temperature of about 200° C. to about 500° C., particularly at about 250° C. to about 400° C., for about a few seconds to about a few minutes.

Also, the layer after elongating and heat treatment may be cooled slowly, particularly at a speed of about 50° C./second or lower.

The layer may be formed as a single layer or as multiple layers.

An article including the poly(amide-benzoxazole) copolymer may have a total light transmittance of about 80% or higher, for example, of about 85% or higher, for example, of about 88% or higher, at a wavelength range of about 380 nanometers (nm) to about 750 nm.

The article including the poly(amide-benzoxazole) copolymer may have a light transmittance of about 70% or higher, for example, of about 80% or higher, for example, of about 85% or higher, at a wavelength range of about 430 nm.

When the light transmittance of the article including the poly(imide-benzoxazole) copolymer is within the above ranges, the article may have excellent or improved color reproducibility.

The article may be a film having a thickness of about 50 micrometers, and the film may have YI of less than about 5.5, measured by using ASTM D1926.

The article may be a film having a thickness of about 50 μm, and the film may have a tension modulus of about 4.0 giga Pascals (GPa) or higher, measured by using ASTM D882.

The article may be a film having a thickness of about 50 μm, and the film may have YI of less than about 3.8, measured by using ASTM D1926.

The article may be a film having a thickness of about 50 μm, and the film may have a tension modulus of about 4.3 GPa or higher, measured by using ASTM D882.

That is, the article may have increased tension modulus, while excellent optical properties of polyimide or poly (imide-amide) copolymer are maintained, for example, low YI.

When the tension modulus is within the range, the article may have high hardness. When the YI is within the range, the article may be transparent and colorless.

According to yet another embodiment, provided is a display device including the article.

As mentioned above, as the article has increased tension modulus, while good optical properties are maintained, for example, low YI, it may be used as a window film of a flexible display device.

Hereafter, the technology of this disclosure is described in detail with reference to examples. The following examples and comparative examples are not restrictive but are illustrative.

EXAMPLES

Examples 1 to 4 and Comparative Examples 1 and 2: Synthesis of poly(imide-benzoxazole) copolymer 833 grams of N,N-dimethyl acetamide ("DMAC") is added in a 1 liter flask reactor, equipped with agitator, dropping funnel, temperature adjustor, $N_2$-inputting apparatus, and cooler, under nitrogen atmosphere, and the temperature is set to 25° C. To the reactor, 2,2'-bis(trifluoromethyl)benzidine ("TFDB") and 6-amino-2-(4-aminophenyl) benzoxazole ("6ABO") are added in an amount described in Table 1 below and dissolved, while maintaining the temperature at 25° C. To the reactor, 2,2-bis(3,4-dicarboxyphenyl)hexafluoropropane dianhydride ("6FDA") and 3,3',4,4'-biphenyl tetracarboxylic dianhydride ("BPDA") are added in an amount described in Table 1 below, and the reaction mixture is agitated to dissolve solid components, which are allowed to react with each other for a predetermined period. The temperature is maintained at 25° C. Upon completion of the reaction, poly (amic acid-benzoxazole) solution having a solid content of about 10 percent by weight (weight %) is obtained.

39 grams of acetic anhydride is added to the obtained poly amic acid solution and the reaction mixture is agitated for 30 minutes. Subsequently, 30 grams of pyridine is added and the reaction mixture is further agitated for 24 hours to produce poly(imide-benzoxazole) copolymer solution.

Synthesis Example and Evaluation Example 1: Manufacturing Poly(imide-benzoxazole) Film and Evaluation of Properties Each poly(imide-benzoxazole) copolymer solution prepared according to Examples 1 to 4 and Comparative Examples 1 and 2 is coated on a glass substrate, and maintained on a hot plate set at 80° C. for 1 hour for drying. The glass substrates coated with the solutions are placed in a furnace, heat treated from room temperature to about 250° C. at a heating rate of 3° C./minute, and slowly cooled to room temperature. The poly(imide-benzoxazole) films having thicknesses as described in Table 1 below are laminated from the substrates.

In order to evaluate the films, yellowness indices (YI at 50° C.) and tension moduli of the obtained films are measured and summarized in Table 1.

YI is measured for a film having a thickness of 50 μm by using ASTM D1925.

Tension modulus is measured by using ASTM D882.

TABLE 1

|  | Composition (mol %) | | | | Thickness | YI | Tension modulus |
|---|---|---|---|---|---|---|---|
|  | TFDB | 6ABO | BPDA | 6FDA | (μm) | (@ 50 μm) | (GPa) |
| Comparative Example 1 | 100 | 0 | 20 | 80 | 55 | 1.5 | 3.9 |
| Example 1 | 99 | 1 | 20 | 80 | 56 | 1.6 | 4.3 |
| Example 2 | 97 | 3 | 20 | 80 | 59 | 1.8 | 4.3 |
| Comparative Example 2 | 90 | 10 | 20 | 80 | 53 | 2.8 | 3.8 |
| Example 3 | 99 | 1 | 40 | 60 | 49 | 2.0 | 4.2 |
| Example 4 | 99 | 1 | 50 | 50 | 49 | 2.4 | 4.3 |

As shown in Table 1, the films prepared from the compositions according to Examples 1 to 4, in which BPDA and 6FDA are included as monomers of tetracarboxylic acid dianhydride and TFDB and 6ABO including a benzoxazole group are included as monomers of diamine, have increased tension moduli, while maintaining YI values in a certain desired range, in contrast to the films prepared from the compositions according to Comparative Examples 1 and 2, in which 6ABO is not included.

Meanwhile, if the amount of 6ABO exceeds 10 mol % based on the total mole number of the diamines, tension modulus of the film decreases, and YI of the film further increases.

Examples 5 to 7 and Comparative Examples 3 and 4: Synthesis of Poly(Imide-Benzoxazole-Amide) Copolymer 670 grams of N,N-dimethyl acetamide ("DMAC") is added in a 1 liter flask reactor, equipped with agitator, dropping funnel, temperature adjustor, $N_2$-inputting apparatus, and cooler, under nitrogen atmosphere, and the temperature is set to 25° C. To the reactor, 2,2'-bis(trifluoromethyl)benzidine ("TFDB") and 6-amino-2-(4-aminophenyl)benzoxazole ("6ABO") are added in an amount described in Table 2 below and dissolved, while maintaining the temperature at 25° C. Terephthaloyl chloride ("TPCl") is added every 5 minutes for 10 times and the reaction mixture is agitated for 2 hours. Then, 2,2-bis(3,4-dicarboxyphenyl)hexafluoropropane dianhydride ("6FDA") and 3,3',4,4' biphenyl tetracarboxylic dianhydride ("BPDA") are added in an amount described in Table 2 below, the reaction mixture is agitated to dissolve the solid components, which are allowed to react with each other for a predetermined period. The temperature is maintained at 25° C. Upon completion of the reaction, poly(amic acid-benzoxazole-amide) solution having a solid content of about 10 weight % is obtained.

39 grams of acetic anhydride is added to the obtained poly(amic acid-benzoxazole-amide) solution and the reaction mixture is agitated for 30 minutes. Subsequently, 30 grams of pyridine is added and the reaction mixture is further agitated for 24 hours to produce poly(imide-benzoxazole-amide) copolymer solution. The obtained solution is precipitated by water, and the precipitated solid contents are filtered and pyrolized 2 times. The finally obtained solid contents are dispersed in methanol and stirred for 30 minutes, and the powder obtained by filtration is dried at 120° C. for 24 hours to obtain poly(imide-benzoxazole-amide) copolymer powder.

Synthesis Example and Evaluation Example 2: Manufacturing Poly(imide-benzoxazole-Amide) Film and Evaluation of Properties Each 12 gram portion of the poly(imide-benzoxazole-amide) copolymer powders according to Examples 5 to 7 and Comparative Examples 3 and 4 is dissolved in 88 grams of N,N-dimethylacetamide (DMAc) to obtain solutions having 12 weight % of solid contents, respectively. 1.2 grams of acetic anhydride is added to the obtained solution and the reaction mixture is agitated for 30 minutes. Then, 0.9 grams of pyridine is added, and the reaction mixture is further agitated for 24 hours to produce poly(imide-benzoxazole-amide) copolymer solution.

The obtained poly(imide-benzoxazole-amide) solution is coated on a glass substrate, and the coated glass substrate is maintained on a hot plate set on 80° C. for 1 hour for drying. The glass substrates coated with the solutions are placed in a furnace, heat treated from room temperature to about 250° C. at a heating rate of 3° C./minute, and slowly cooled to room temperature. The poly(imide-benzoxazole-amide) films having thickness values as described in Table 2 below are laminated from the substrates.

In order to evaluate the films, yellowness indices (YI at 50° C.) and tension moduli of the obtained films are measured and summarized in Table 2.

YI is measured for a film having a thickness of 50 μm by using ASTM D1925.

Tension modulus is measured by using ASTM D882.

TABLE 2

|  | Composition (mol %) | | | | | Thickness | YI | Tension modulus |
| --- | --- | --- | --- | --- | --- | --- | --- | --- |
|  | TFDB | 6ABO | TPCL | BPDA | 6FDA | (μm) | (@ 50 μm) | (GPa) |
| Comparative Example 3 | 100 | 0 | 55 | 18 | 27 | 49 | 2.2 | 5.6 |
| Example 5 | 99 | 1 | 55 | 18 | 27 | 52 | 2.4 | 6.2 |
| Example 6 | 97 | 3 | 55 | 18 | 27 | 51 | 3.2 | 6.5 |
| Example 7 | 95 | 5 | 55 | 18 | 27 | 50 | 3.8 | 6.5 |
| Comparative Example 4 | 90 | 10 | 55 | 18 | 27 | 50 | 5.5 | 6.3 |

As shown from Table 2, the films prepared from the compositions according to Examples 5 to 7, in which BPDA and 6FDA as monomers of tetracarboxylic acid dianhydride, TPCl as a monomer of a dicarboxylic acid dichloride, and TFDB and 6ABO including a benzoxazole group as monomers of diamine are included, have increased tension moduli, while maintaining YI values in a certain desired range, in contrast to the films prepared from the compositions according to Comparative Examples 3 and 4, in which 6ABO is not included.

Meanwhile, if the amount of 6ABO exceeds 10 mol % based on the total mole number of diamines, tension modulus of the film decreases, and YI of the film further increases, which is the same effect as observed in the poly(imide-benzoxazole) film.

As shown from Examples 1 to 7 and Comparative Examples 1 to 4, the poly(imide-benzoxazole) copolymer or poly(imide-benzoxazole-amide) copolymer according to an embodiment have increased tension modulus, while maintaining yellowness index in a predetermined range of polyimide or poly(imide-amide) copolymer.

Accordingly, the poly(imide-benzoxazole) copolymer or poly(imide-benzoxazole-amide) copolymer according to an embodiment may be advantageously used in an application requiring high light transmittance, as well as high hardness. For example, the poly(imide-benzoxazole) copolymer or poly(imide-benzoxazole-amide) copolymer according to an embodiment may be used as a window film of a flexible display device.

While this disclosure has been described in connection with what is presently considered to be practical exemplary embodiments, it is to be understood that the present inventive concept is not limited to the disclosed embodiments, but, on the contrary, is intended to cover various modifications and equivalent arrangements which are included within the spirit and scope of the appended claims.

What is claimed is:

1. A composition for preparing a poly(imide-benzoxazole) copolymer, comprising:
   a tetracarboxylic acid dianhydride comprising a combination of 3,3'4,4'-biphenyl tetracarboxylic dianhydride and 4,4'-(hexafluoroisopropylidene)diphthalic anhydride,
   a diamine comprising 2,2'-bis(fluoromethyl)benzidine, and
   a diamine represented by Chemical Formula 3:

Chemical Formula 3
   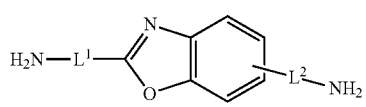

wherein in Chemical Formula 3,
   $L^1$ is a phenylene group, and $L^2$ is a single bond,
   wherein the mole ratio of the tetracarboxylic acid dianhydride to the total moles of the diamine comprising 2,2'-bis(fluoromethyl)benzidine and the diamine represented by Chemical Formula 3 is about 1:1, and wherein an amount of the diamine represented by Chemical Formula 3 is 1 mole percent to 5 mole percent based on the total mole number of the diamine comprising 2,2'-bis(fluoromethyl)benzidine and the diamine represented by Chemical Formula 3.

2. The composition for preparing the poly(imide-benzoxazole) copolymer according to claim 1, wherein the tetracarboxylic acid dianhydride further comprises one or more selected from bicyclo[2.2.2]oct-7-ene-2,3,5,6-tetracarboxylic dianhydride, 3,3',4,4'-diphenylsulfone tetracarboxylic dianhydride, 4,4'-oxydiphthalic anhydride, pyromellitic dianhydride, 4-(2,5-dioxotetrahydrofuran-3-yl)-1,2,3,4-tetrahydronaphthalene-1,2-dicarboxylic anhydride, and bis(3,4-dicarboxyphenyl)sulfone dianhydride.

3. The composition for preparing the poly(imide-benzoxazole) copolymer according to claim 1,
   wherein in the tetracarboxylic acid dianhydride 3,3',4,4'-biphenyl tetracarboxylic dianhydride is present in an amount of about 10 mole percent to about 55 mole percent and 4,4'-(hexafluoroisopropylidene)diphthalic anhydride is present in an amount of about 90 mole percent to about 45 mole percent.

4. A poly(imide-benzoxazole) copolymer prepared from the composition according to claim 1.

5. A poly(imide-benzoxazole) copolymer comprising:
   (i) a structural unit represented by Chemical Formula 4, Chemical Formula 5, or a combination thereof; and
   (ii) a structural unit represented by Chemical Formula 6, Chemical Formula 7, or a combination thereof:

Chemical Formula 4
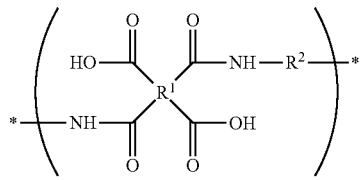

Chemical Formula 5
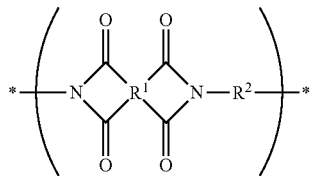

Chemical Formula 6
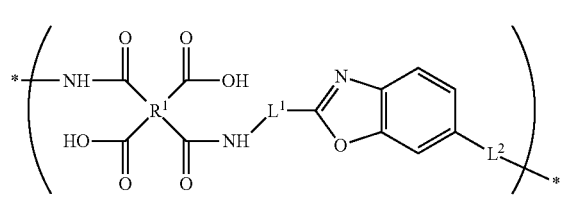

Chemical Formula 7
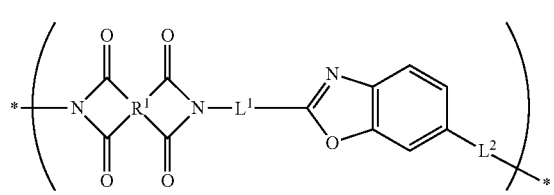

wherein in Chemical Formulae 4 to 7,
$R^1$ is represented by Chemical Formula 8 and Chemical Formula 9:

Chemical Formula 8
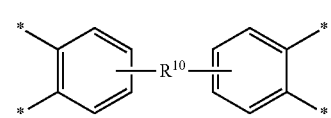

Chemical Formula 9
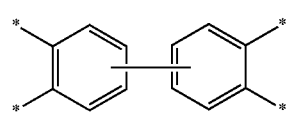

wherein in Chemical Formula 8,
$R^{10}$ is $C(CF_3)_2$,
wherein in Chemical Formulae 4 and 5, $R^2$ is represented by Chemical Formula 13, Chemical Formula 13
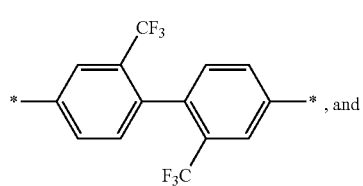
, and wherein in Chemical Formulae 6 and 7,
$L^1$ is a phenylene group, and $L^2$ is a single bond, wherein an amount of the structural unit represented by Chemical Formula 6, Chemical Formula 7, or a combination thereof is 1 mole percent to 5 mole percent based on the mole number of the total structural units in the poly(imide-benzoxazole) copolymer.

6. The poly(imide-benzoxazole) copolymer according to claim 5,
wherein $R^1$ in Chemical Formulae 4 to 7 comprises the structural unit represented by Chemical Formula 8 in an amount of about 90 mole percent to about 45 mole percent, and the structural unit represented by Chemical Formula 9 in an amount of about 10 mole percent to about 55 mole percent.

7. The poly(imide-benzoxazole) copolymer according to claim 5, further comprising one or more structural units selected from the structural units represented by Chemical Formulae 14 to 17:

Chemical Formula 14

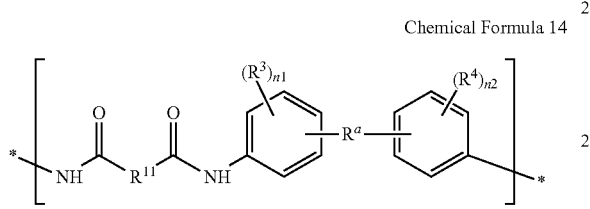

wherein in Chemical Formula 14,
$R^a$ is a substituted or unsubstituted C3 to C30 alicyclic organic group, a substituted or unsubstituted C6 to C30 aromatic organic group, a substituted or unsubstituted C2 to C30 heterocyclic group, or a substituted or unsubstituted C13 to C20 fluorenylene group,
$R^{11}$ is a substituted or unsubstituted C6 to C30 aromatic organic group,
$R^3$ and $R^4$ are the same or different and each are independently a halogen, a hydroxy group, a substituted or unsubstituted C1 to C10 aliphatic organic group, a substituted or unsubstituted C6 to C20 aromatic organic group, an alkoxy group of formula —$OR^{200}$, wherein $R^{200}$ is a C1 to C10 aliphatic organic group, a silyl group of formula —$SiR^{201}R^{202}R^{203}$, wherein $R^{201}$, $R^{202}$, and $R^{203}$ are the same or different and each are independently a hydrogen, or a C1 to C10 aliphatic organic group, and
n1 and n2 are the same or different and each are independently an integer ranging from 0 to 4;

Chemical Formula 15

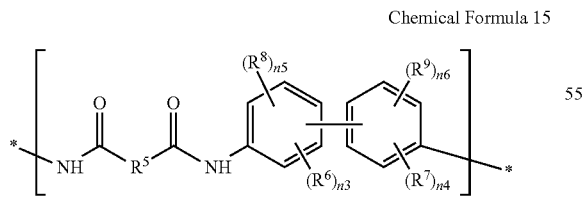

wherein in Chemical Formula 15,
$R^5$ is a substituted or unsubstituted C6 to C30 aromatic organic group,
$R^6$ and $R^7$ are the same or different and each are independently an electron withdrawing group selected from —$CF_3$, —$CCl_3$, —$CBr_3$, —$Cl_3$, —F, —Cl, —Br, —I, —$NO_2$, —CN, —$COCH_3$, and —$CO_2C_2H_5$,
$R^8$ and $R^9$ are the same or different, and each are independently a halogen, a hydroxy group, a substituted or unsubstituted C1 to C10 aliphatic organic group, a substituted or unsubstituted C6 to C20 aromatic organic group, an alkoxy group of formula —$OR^{204}$, wherein $R^{204}$ is a C1 to C10 aliphatic organic group, or a silyl group of formula —$SiR^{205}R^{206}R^{207}$, wherein $R^{205}$, $R^{206}$, and $R^{207}$ are the same or different, and each are independently a hydrogen, a C1 to C10 aliphatic organic group,
n3 is an integer ranging from 1 to 4,
n5 is an integer ranging from 0 to 3,
provided that n3+n5 is an integer ranging from 1 to 4,
n4 is an integer ranging from 1 to 4, and
n6 is an integer ranging from 0 to 3,
provided that n4+n6 is an integer ranging from 1 to 4;

Chemical Formula 16

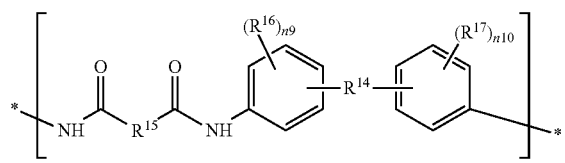

wherein in Chemical Formula 16,
$R^{14}$ is O, S, C(=O), CH(OH), S(=O)$_2$, Si(CH$_3$)$_2$, (CH$_2$)$_p$ wherein 1≤p≤10, (CF$_2$)$_q$, wherein 1≤q≤10, C(CH$_3$)$_2$, C(CF$_3$)$_2$, C(=O)NH, or a substituted or unsubstituted C6 to C30 aromatic organic group, wherein the aromatic organic group includes one aromatic ring, two or more aromatic rings fused together to provide a condensed ring system, or two or more aromatic rings linked through a single bond or through a functional group selected from a fluorenylene group, O, S, C(=O), CH(OH), S(=O)$_2$, Si(CH$_3$)$_2$, (CH$_2$)$_p$ wherein 1≤p≤10, (CF$_2$)$_q$ wherein 1≤q≤10, C(CH$_3$)$_2$, C(CF$_3$)$_2$, and C(=O)NH,
$R^{15}$ is a substituted or unsubstituted C6 to C30 aromatic organic group,
$R^{16}$ and $R^{17}$ are the same or different, and each are independently a halogen, a hydroxy group, a substituted or unsubstituted C1 to C10 aliphatic organic group, a substituted or unsubstituted C6 to C20 aromatic organic group, an alkoxy group of formula —$OR^{212}$, wherein $R^{212}$ is a C1 to C10 aliphatic organic group, or a silyl group of formula —$SiR^{213}R^{214}R^{215}$, wherein $R^{213}$, $R^{214}$, and $R^{215}$ are the same or different, and each are independently a hydrogen or a C1 to C10 aliphatic organic group, and
n9 and n10 are each independently an integer ranging from 0 to 4;

Chemical Formula 17

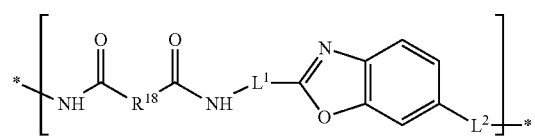

wherein in Chemical Formula 17,
$R^{18}$ is O, S, C(=O), CH(OH), S(=O)$_2$, Si(CH$_3$)$_2$, (CH$_2$)$_p$ wherein 1≤p≤10, (CF$_2$)$_q$, wherein 1≤q≤10, C(CH$_3$)$_2$, $C(CF_3)_2$, $C(=O)NH$, or a substituted or unsubstituted C6 to C30 aromatic organic group, wherein the aromatic organic group includes one aromatic ring, two or more aromatic rings fused together to provide a condensed ring system, or two or more aromatic rings linked through a single bond or through a functional group selected from a fluorenylene group, O, S, $C(=O)$, $CH(OH)$, $S(=O)_2$, $Si(CH_3)_2$, $(CH_2)_p$ wherein $1 \leq p \leq 10$, $(CF_2)_q$ wherein $1 \leq q \leq 10$, $C(CH_3)_2$, $C(CF_3)_2$, and $C(=O)NH$, $L^1$ is a phenylene group, and $L^2$ is a single bond.

8. An article comprising the poly(imide-benzoxazole) copolymer according to claim 5.

9. The article according to claim 8, wherein the article is a film having a thickness of about 50 micrometers, and the film has yellowness index of less than about 5.5, measured by using ASTM D1926, and tension modulus of about 4.0 giga Pascals or higher, measured by ASTM D882.

10. A display device comprising the article according to claim 8.

* * * * *